US012661917B2

(12) United States Patent
Kuroda

(10) Patent No.: US 12,661,917 B2
(45) Date of Patent: Jun. 23, 2026

(54) PRINTING APPARATUS, METHOD OF CONTROLLING PRINTING APPARATUS, PRINTING SYSTEM, AND STORAGE MEDIUM

(71) Applicant: CANON KABUSHIKI KAISHA, Tokyo (JP)

(72) Inventor: Toshiyuki Kuroda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 149 days.

(21) Appl. No.: 18/118,802

(22) Filed: Mar. 8, 2023

(65) Prior Publication Data

US 2023/0294440 A1 Sep. 21, 2023

(30) Foreign Application Priority Data

Mar. 16, 2022 (JP) ................................ 2022-041311

(51) Int. Cl.
*B41J 29/393* (2006.01)
*B41J 2/17* (2006.01)

(52) U.S. Cl.
CPC ........... *B41J 29/393* (2013.01); *B41J 2/1707* (2013.01)

(58) Field of Classification Search
CPC ..... B41J 29/393; B41J 2/1707; G06F 3/1203; G06F 3/1229; G06F 3/1285; G06Q 10/06311; G06Q 10/0832; G06Q 10/30
See application file for complete search history.

(56) References Cited

U.S. PATENT DOCUMENTS

| | | | | |
|---|---|---|---|---|
| 9,707,782 | B2 | 7/2017 | Yamagishi | |
| 10,374,909 | B2 | 8/2019 | Kawai | |
| 10,997,480 | B2 | 5/2021 | Nakane | |
| 11,007,786 | B2 | 5/2021 | Tokisawa et al. | |
| 11,416,182 | B2 | 8/2022 | Shirai et al. | |
| 12,214,598 | B2 | 2/2025 | Schalk et al. | |
| 2020/0047493 | A1* | 2/2020 | Kohnotoh | B41J 2/16508 |
| 2021/0245521 | A1* | 8/2021 | Schalk | B41J 2/17566 |

(Continued)

FOREIGN PATENT DOCUMENTS

| | | | |
|---|---|---|---|
| JP | 2002-074010 | A | 3/2002 |
| JP | 2011-113241 | A | 6/2011 |
| JP | 2015044379 | A | 3/2015 |

(Continued)

OTHER PUBLICATIONS

Mutemwa Muyowa et al., “Cyber Security Threats and Mitigation Techniques for Multifunctional Devices”, 2018 Conference on Information Communications Technology and Society, IEEE, Mar. 8, 2018, pp. 1-6, XP033352302.

(Continued)

*Primary Examiner* — Jannelle M Lebron
(74) *Attorney, Agent, or Firm* — VENABLE LLP

(57) ABSTRACT

A printing apparatus to be provided to a user based on a contract and to be returned by transportation arranged by the user after cancellation of the contract includes a control unit that performs control based on cancellation of the contract by the user in such a way as to carry out a transportation preparatory operation being a preparatory operation to be carried out before the transportation and includes a closing operation to prevent ink leakage.

16 Claims, 18 Drawing Sheets

(56) References Cited

U.S. PATENT DOCUMENTS

2022/0032644 A1 * 2/2022 Arnold ....................... B41J 2/17

FOREIGN PATENT DOCUMENTS

| | | | |
|---|---|---|---|
| JP | 2017016636 | A | 1/2017 |
| JP | 2017-49767 | A | 3/2017 |
| JP | 2017052253 | A | 3/2017 |
| JP | 2020059131 | A | 4/2020 |
| JP | 2020118716 | A | 8/2020 |
| JP | 2021-519711 | A | 8/2021 |
| JP | 2021160102 | A | 10/2021 |

OTHER PUBLICATIONS

European Search Report dated Aug. 21, 2023, in related European Patent Application No. 23158830.2.

Japanese Office Action dated Jan. 27, 2026, in related Japanese Patent Application No. 2022-041311.

* cited by examiner

OVERALL EXTERNAL VIEW

UPPER SURFACE EXTERNAL VIEW

HORIZONTAL CROSS-SECTIONAL VIEW

API REQUEST

API RESPONSE

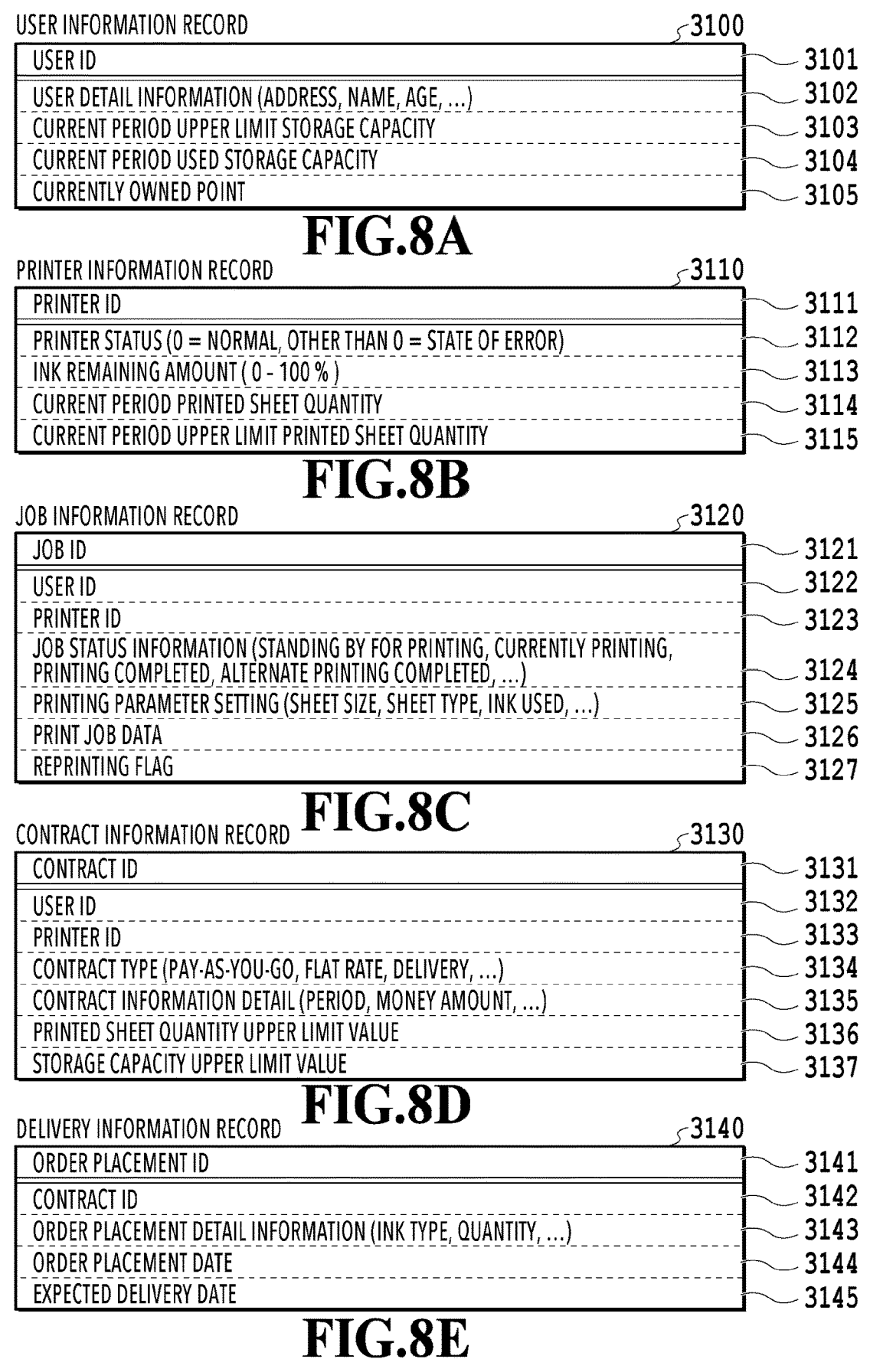

USER INFORMATION RECORD 3100

| | |
|---|---|
| USER ID | 3101 |
| USER DETAIL INFORMATION (ADDRESS, NAME, AGE, ...) | 3102 |
| CURRENT PERIOD UPPER LIMIT STORAGE CAPACITY | 3103 |
| CURRENT PERIOD USED STORAGE CAPACITY | 3104 |
| CURRENTLY OWNED POINT | 3105 |

FIG.8A

PRINTER INFORMATION RECORD 3110

| | |
|---|---|
| PRINTER ID | 3111 |
| PRINTER STATUS (0 = NORMAL, OTHER THAN 0 = STATE OF ERROR) | 3112 |
| INK REMAINING AMOUNT ( 0 - 100 % ) | 3113 |
| CURRENT PERIOD PRINTED SHEET QUANTITY | 3114 |
| CURRENT PERIOD UPPER LIMIT PRINTED SHEET QUANTITY | 3115 |

FIG.8B

JOB INFORMATION RECORD 3120

| | |
|---|---|
| JOB ID | 3121 |
| USER ID | 3122 |
| PRINTER ID | 3123 |
| JOB STATUS INFORMATION (STANDING BY FOR PRINTING, CURRENTLY PRINTING, PRINTING COMPLETED, ALTERNATE PRINTING COMPLETED, ...) | 3124 |
| PRINTING PARAMETER SETTING (SHEET SIZE, SHEET TYPE, INK USED, ...) | 3125 |
| PRINT JOB DATA | 3126 |
| REPRINTING FLAG | 3127 |

FIG.8C

CONTRACT INFORMATION RECORD 3130

| | |
|---|---|
| CONTRACT ID | 3131 |
| USER ID | 3132 |
| PRINTER ID | 3133 |
| CONTRACT TYPE (PAY-AS-YOU-GO, FLAT RATE, DELIVERY, ...) | 3134 |
| CONTRACT INFORMATION DETAIL (PERIOD, MONEY AMOUNT, ...) | 3135 |
| PRINTED SHEET QUANTITY UPPER LIMIT VALUE | 3136 |
| STORAGE CAPACITY UPPER LIMIT VALUE | 3137 |

FIG.8D

DELIVERY INFORMATION RECORD 3140

| | |
|---|---|
| ORDER PLACEMENT ID | 3141 |
| CONTRACT ID | 3142 |
| ORDER PLACEMENT DETAIL INFORMATION (INK TYPE, QUANTITY, ...) | 3143 |
| ORDER PLACEMENT DATE | 3144 |
| EXPECTED DELIVERY DATE | 3145 |

FIG.8E

PRINTING APPARATUS, METHOD OF CONTROLLING PRINTING APPARATUS, PRINTING SYSTEM, AND STORAGE MEDIUM

BACKGROUND OF THE INVENTION

Field of the Invention

The present invention relates to a printing apparatus, a method of controlling a printing apparatus, a printing system, and a storage medium.

Description of the Related Art

A delivery service of a cartridge or the like filled with a printing material to a contracted user of a printing apparatus in conformity to a status of use of the printing apparatus has been put into practice in recent years. In this context, Japanese Patent Laid-Open No. 2017-49767 discloses a method of clarifying a timing to complete cancellation of a service contract concerning a printing apparatus.

There is a form of service that requires a user to return the printing apparatus in a case where the user cancels the service contract concerning the printing apparatus. In a case of transporting the printing apparatus for return, it is necessary to remove inks inside ink flow channels inclusive of a print head in advance for preventing leakage of the inks to outside and to erase user setting information for preventing leakage of the user setting information in the printing apparatus, collectively as a transportation preparatory operation.

Japanese Patent Laid-Open No. 2017-49767 is configured to clarify the timing to complete cancellation of the service contract by causing a server to receive a response from the printing apparatus indicating that a status of a cartridge is changed to an unusable state.

However, the printing apparatus according to Japanese Patent Laid-Open No. 2017-49767 is not configured to check a status of execution of the transportation preparatory operation. Accordingly, there is a risk of ink leakage during transportation of the printing apparatus or information leakage due to the user setting information that remains in the printing apparatus in the case where the user has not carried out the transportation preparatory operation.

SUMMARY OF THE INVENTION

Given the circumstances, it is an object of the present invention to provide a printing apparatus, a method of controlling a printing apparatus, and a storage medium, which are capable of suppressing ink leakage during packing work and transportation in a case where a user transports a printing apparatus, and leakage of user setting information in the printing apparatus after cancellation of the service contract involving the printing apparatus.

To attain the object, a printing apparatus according to the present invention is a printing apparatus to be provided to a user based on a contract and to be returned by transportation arranged by the user after cancellation of the contract, which includes a control unit that performs control in such a way as to carry out a transportation preparatory operation based on cancellation of the contract by the user, the transportation preparatory operation being a preparatory operation to be carried out before the transportation.

According to the present invention, it is possible to provide a printing apparatus, a method of controlling a printing system, and a storage medium, which are capable of suppressing ink leakage during packing work and transportation in a case where a user transports a printing apparatus, and leakage of user setting information in the printing apparatus after cancellation of the service contract involving the printing apparatus.

Further features of the present invention will become apparent from the following description of exemplary embodiments with reference to the attached drawings.

BRIEF DESCRIPTION OF THE DRAWINGS

FIG. 8A is a diagram showing a data structure of a record;

FIG. 8B is a diagram showing a data structure of another record;

FIG. 8C is a diagram showing a data structure of another record;

FIG. 8D is a diagram showing a data structure of another record;

FIG. 8E is a diagram showing a data structure of another record;

DESCRIPTION OF THE EMBODIMENTS

First Embodiment

A first embodiment of the present invention will be described below with reference to the drawings.

Figure 1:
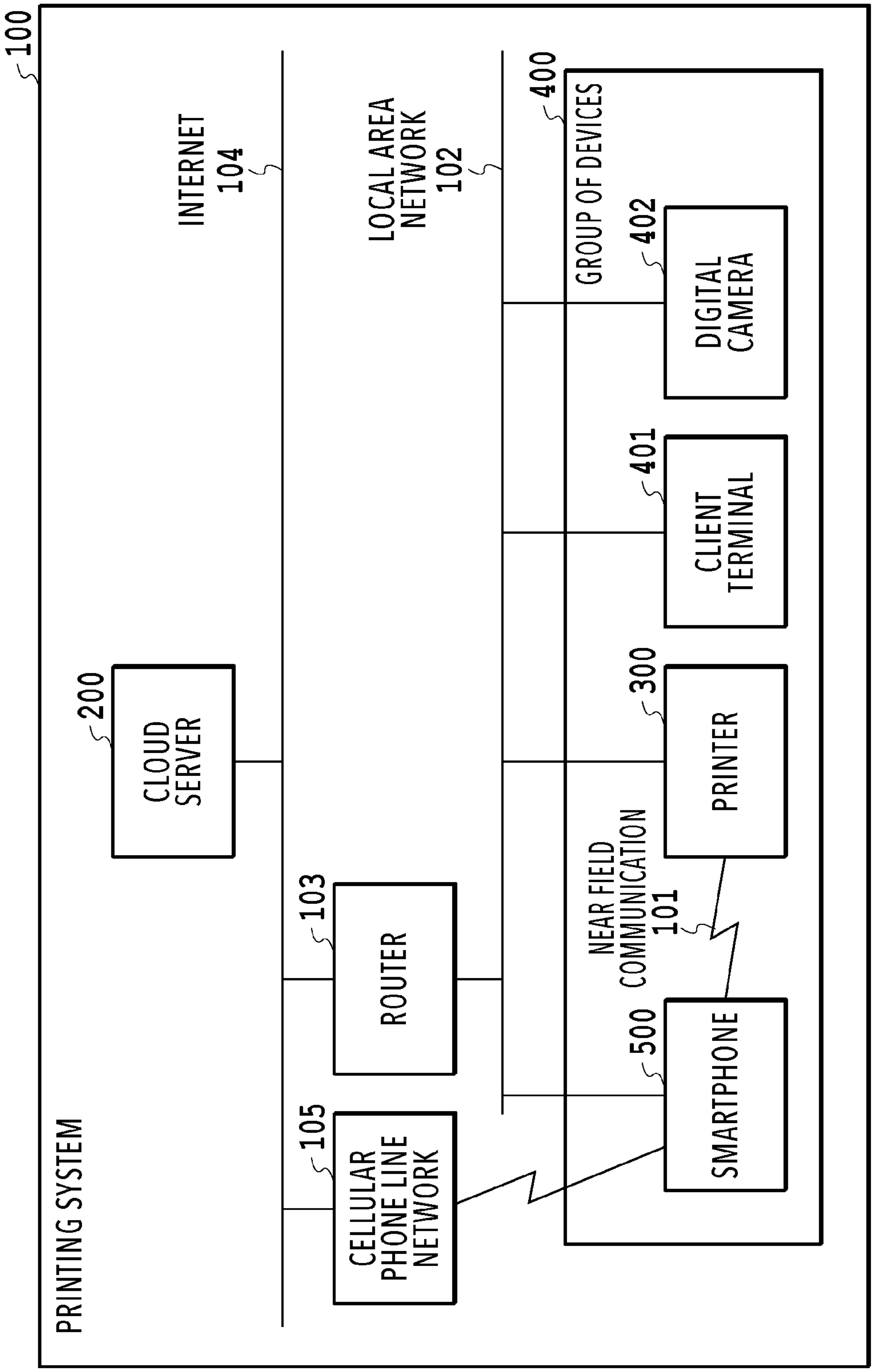
FIG. 1 is a diagram showing a configuration of a printing system.

FIG. 1 is a diagram showing a configuration of a printing system 100 that can apply the present embodiment. The printing system 100 includes a cloud server 200 and a group of devices 400, which are connected to one another through a local area network 102 and the Internet 104. The devices 400 include various devices that can be connected through networks. Examples of the various devices include a smartphone 500, a printing apparatus (hereinafter also referred to as a printer) 300, a client terminal 401 such as a personal computer and a workstation, a digital camera 402, and so forth. Note that the group of devices 400 are not limited only to these types of devices but may also include home electric appliances such as a refrigerator, a television, and an air conditioner.

The devices 400 are connected to one another through the local area network 102 and can be connected to the Internet 104 by way of a router 103 installed in the local area network 102. Although the router 103 is illustrated herein as a device that connects the local area network 102 to the Internet 104, it is also possible to provide a wireless LAN access point function that constitutes local area network 102.

In this case, each device 400 can be configured to join the local area network 102 by establishing connection to the access point through the wireless LAN instead of establishing connection to the router 103 through the wired LAN. For example, the printer 300 or the client terminal 401 can establish the connection through the wired LAN while the smartphone 500 or the digital camera 402 can establish the connection through the wireless LAN.

Each device 400 can communicate with the cloud server 200 by way of the Internet 104 connected through the router 103. Moreover, the devices 400 can communicate with one another by way of the local area network 102. Meanwhile, the smartphone 500 and the printer 300 can communicate with each other by means of near field communication 101. A conceivable example of the near field communication 101 is a system that uses wireless communication in accordance with the Bluetooth (a registered trademark) standards or the NFC standards. In the meantime, the smartphone 500 is also connected to a cellular phone line network 105 so as to be able to communicate with the cloud server 200 through this cellular phone line network 105.

Note that the above-mentioned configuration merely represents an example of the present embodiment, and the effects do not change even in the case of adopting a different configuration. For instance, the above-described example demonstrates the case where the router 103 is provided with the access point function. Instead, the access point may be formed by using a different device from the router 103.

Figure 2A:
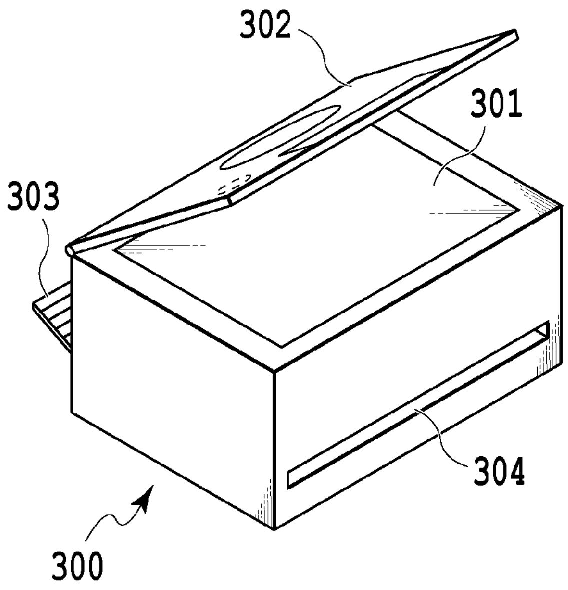
FIG. 2A is a diagram showing a printer.
Figure 2B:
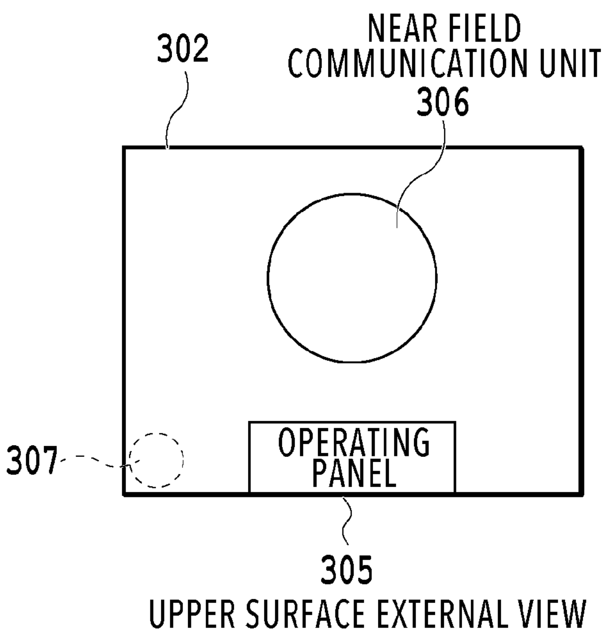
FIG. 2B is another diagram showing the printer.
Figure 2C:
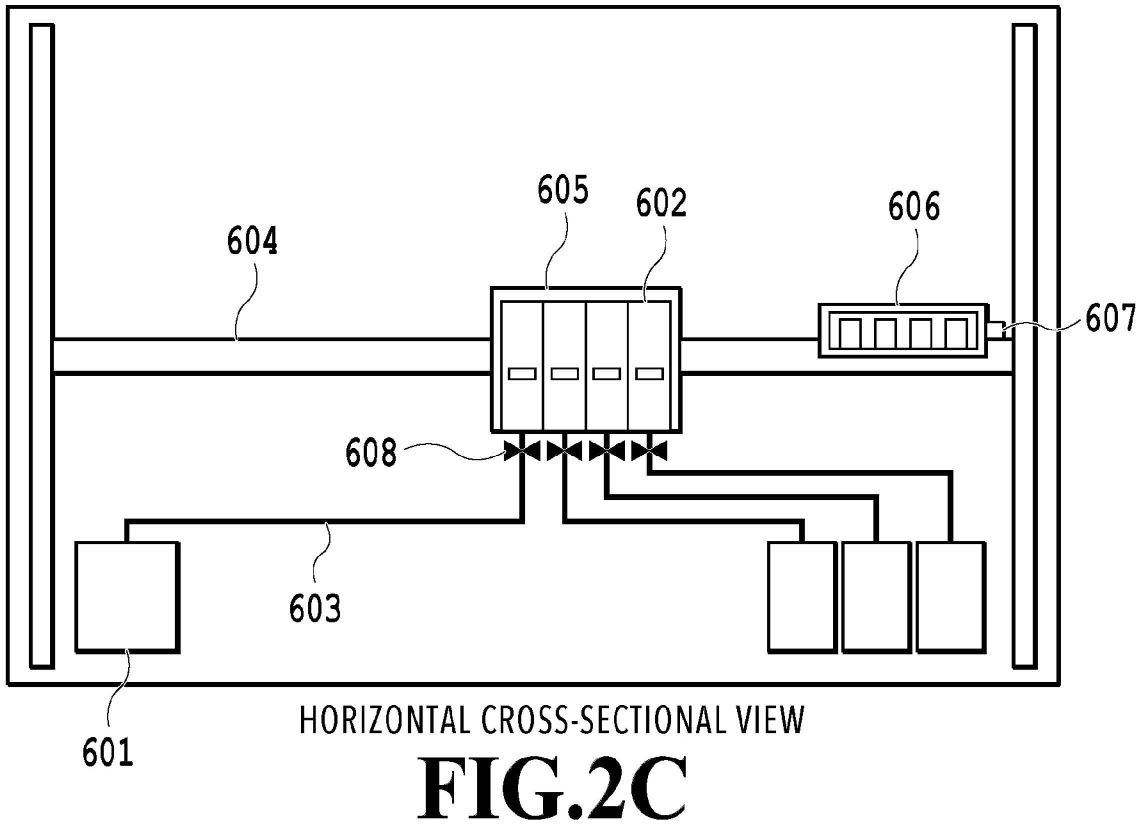
FIG. 2C is another diagram showing the printer.

FIG. 2A is a perspective view showing external appearance of the printer 300. FIG. 2B is a diagram showing the external appearance of an upper surface of the printer 300. FIG. 2C is a cross-sectional view in a horizontal direction in the case where the printer 300 is viewed from a sheet discharge port side.

In the printer 300 of the present embodiment, based on a service use contract, it is possible to issue an ink delivery request in need of such ink delivery depending on a status of the printer 300, and to restrict printing in excess of an upper limit by managing the number of sheets printed by the printer 300. In the meantime, the user is supposed to return the printer 300 by transportation after cancellation of the contract.

The present embodiment will describe an example in which the printer 300 is a multifunction printer (MFP) that serves as a scanner and has other functions at the same time. A platen 301 is a transparent base of glass, which is used for placing an original thereon in order to read the original with a scanner. A platen pressure plate 302 is a cover for pressing the original against the platen so as not to be detached therefrom in the case of reading the original with the scanner, and for keeping outside light from entering a scanner unit. A print sheet insertion port 303 is an insertion port for inserting sheets in various sizes. The sheets inserted into the print sheet insertion port 303 are transported one by one to a printing unit and are discharged from a print sheet discharge port 304 after being subjected to prescribed printing.

An operating panel 305 and a near field communication unit 306 are disposed on an upper part of the platen pressure plate 302. The operating panel 305 is formed from a touch-panel liquid display device, which performs a variety of display and enables a user to perform operation input to the printer 300. The printer 300 is a printer that ejects liquids (hereinafter also referred to as inks) from a print head 602 to perform printing, in which built-in ink tanks 601 are connected to the print head 602 through ink tubes (connectors) 603.

The ink is stored in each built-in ink tank 601. By opening a tank valve 608, the ink in the built-in ink tank 601 is supplied to the print head 602 through the ink tube 603. The ink supplied to the print head 602 is ejected from the print head 602 based on print data received by the print head 602. Meanwhile, the supply of the ink from the built-in ink tank 601 to the print head 602 can be stopped by closing the tank valve 608, so that the ink can be prevented from leaking out of the print head 602.

The printer 300 causes a carriage support portion 604 to support a carriage 605 that mounts the print head 602, causes the carriage 605 to travel right and left along the carriage support portion 604, and performs printing on printing paper by ejecting ink droplets from the print head 602 at the same time. Although the present embodiment will describe an example of a serial printer in which the carriage 605 travels along the carriage support portion 604, the printer may be a line printer or a page printer instead. In addition, the printer of the present embodiment is configured to supply the inks from the built-in ink tanks 601 to the print head 602 through the ink tubes 603. Instead, the printer may be configured to supply the inks by directly inserting the ink tanks into the print head 602.

A cap 606 can protect the print head 602 against drying by bringing the cap 606 into close contact with the print head 602 and shielding the print head 602 from atmosphere. By lifting up a carriage lock pin 607 having a convex shape in a case where the carriage 605 is located above the cap 606, the carriage lock pin 607 is engaged with a not-illustrated member having a concave shape, which is present on a back surface of the carriage 605. In this state, the state of close contact between the cap 606 and the print head 602 can be maintained even in the case where a housing is tilted or vibration is applied, for example. Meanwhile, the print head 602 can be set to a state of being capable of ejecting the droplets by causing the cap 606 to come into close contact with the print head 602 so as to bring the fresh ink to a surface of the print head 602 while discharging the ink on the surface that cannot be ejected due to condensation, fixation, and so forth.

The near field communication unit 306 is a unit for carrying out the near field communication, which can communicate with another near field communication unit as a communication counterpart located within a predetermined distance. A wireless LAN antenna 307 embeds an antenna for performing communication while establishing connection to the local area network 102 by using the wireless LAN.

Figure 3:
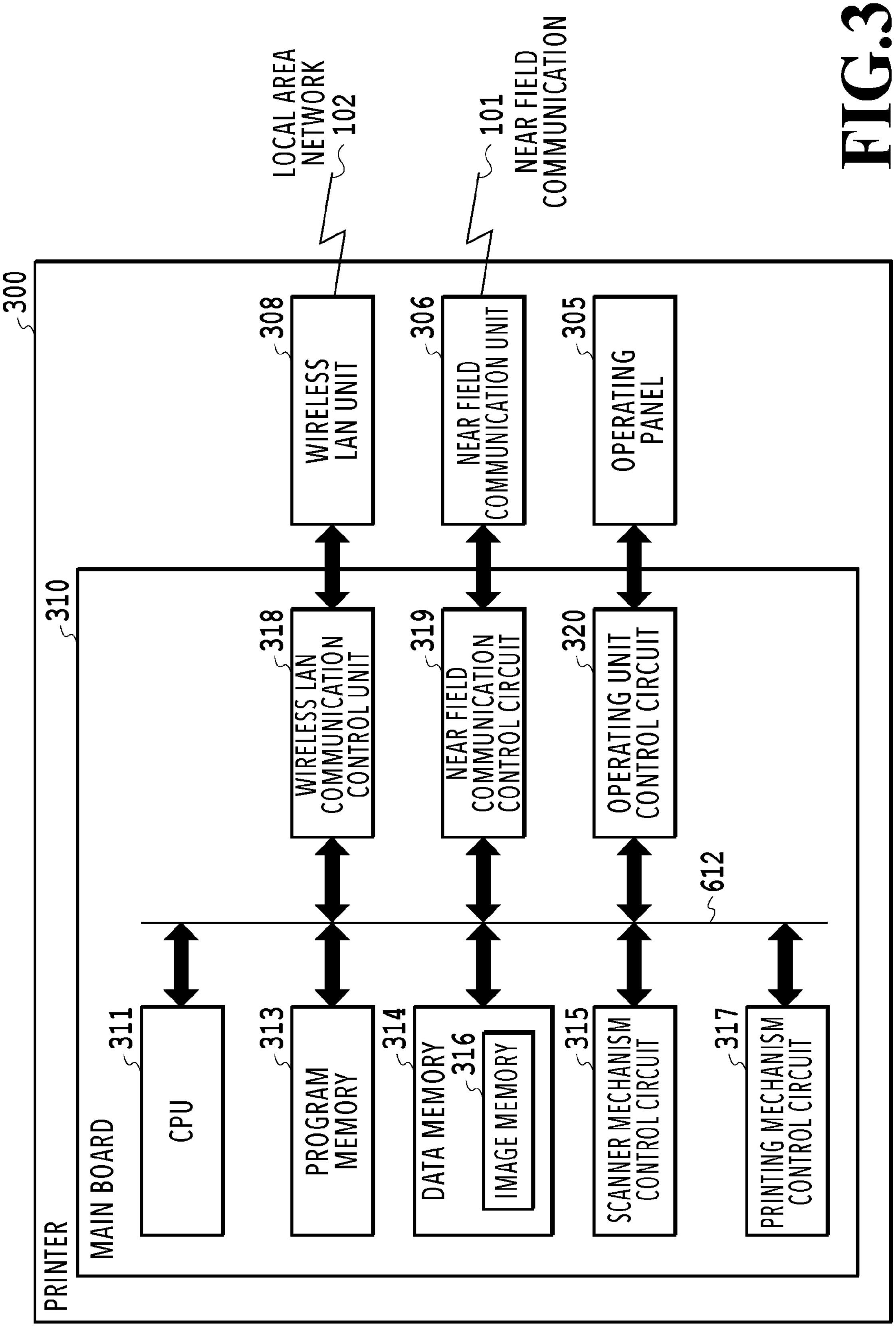
FIG. 3 is a block diagram showing a configuration of the printer.

FIG. 3 is a block diagram showing a configuration of the printer 300. The printer 300 includes a main board 310 that controls the entire apparatus, a wireless LAN unit 308, and the near field communication unit 306. A CPU 311 in the form of a microprocessor embedded on the main board 310 is operated in accordance with a control program stored in a program memory 313 in the form of a ROM connected through an internal bus 312, and with contents in a data memory 314 in the form of a RAM connected likewise.

The CPU 311 reads the original by controlling a scanner mechanism control circuit 315, and stores the read original into an image memory 316 in the data memory 314. The CPU 311 can also print an image in the image memory 316 in the data memory 314 onto a print medium by controlling a printing mechanism control circuit 317. The CPU 311 conducts the wireless LAN communication with a different communication terminal device by controlling the wireless LAN unit 308 through a wireless LAN communication control unit 318. Moreover, the CPU 311 can detect connection to a different near field communication terminal, and transmit and receive data to and from the different near field communication terminal by controlling the near field communication unit 306 through a near field communication control circuit 319. The CPU 311 is capable of displaying the status of the printer 300 and a function selection menu on the operating panel 305, and of accepting operations from a user by controlling an operating unit control circuit 320.

Figure 4:
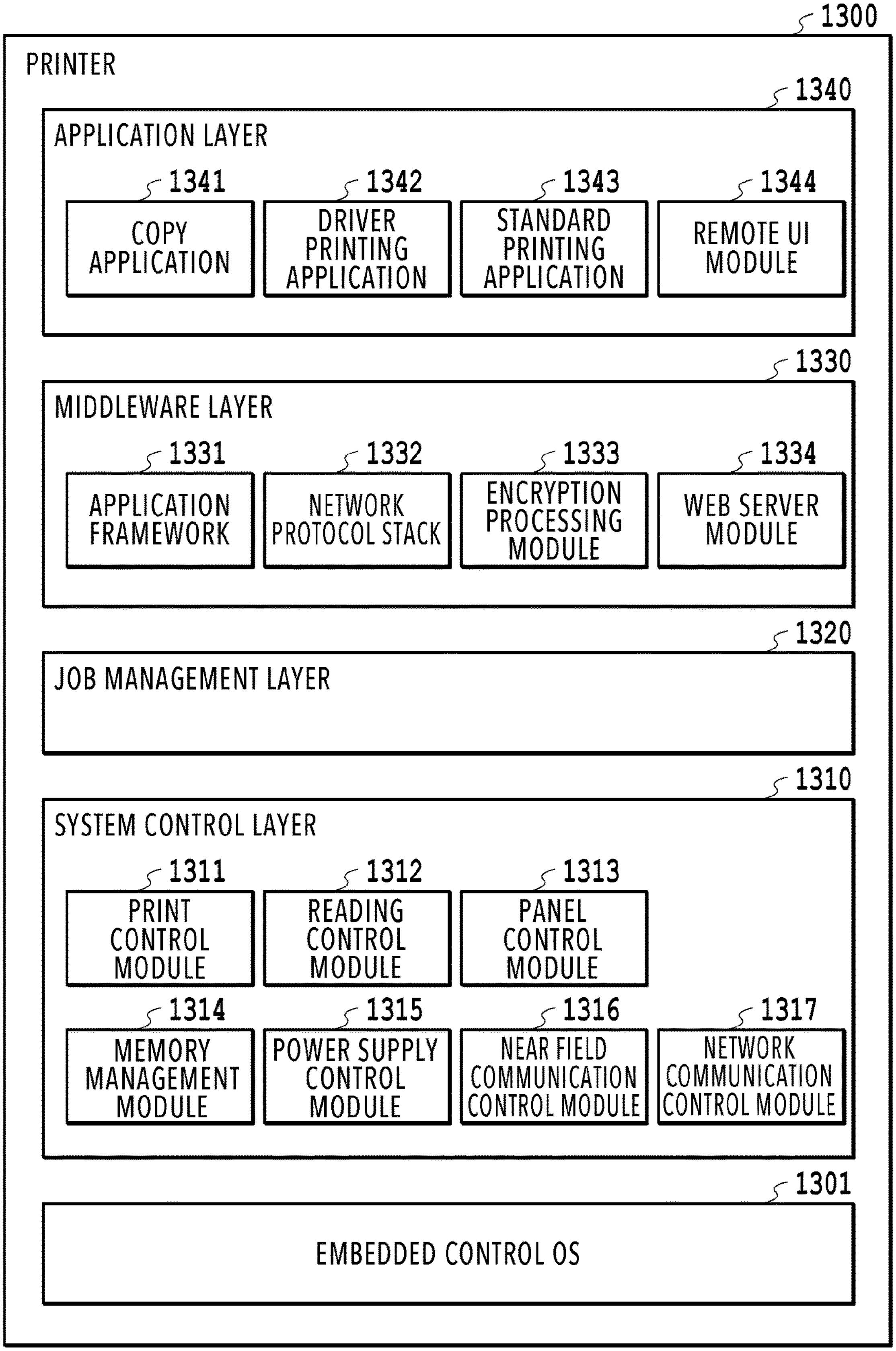
FIG. 4 is a diagram showing a module configuration of software which is operated on the printer.

FIG. 4 is a diagram showing a module configuration of software which is operated on the printer 300. Software 1300 to be operated on the printer 300 is operated on an embedded control operating system (OS) 1301. Modules are broadly categorized into a system control layer 1310, a job management layer 1320, a middleware layer 1330, and an application layer 1340. The embedded control OS 1301 is an operating system (OS) that governs basic operations of the printer control software 1300, and a real time OS having excellent response is generally used therein. The system control layer 1310 is a module group that mainly governs hardware control of the printer 300. A print control module 1311 is a control module for executing a printing operation of the printer 300 by controlling the printing mechanism control circuit 317.

A reading control module 1312 is a control module for executing a reading operation of the original placed on the platen 301 by controlling the scanner mechanism control circuit 315. A panel control module 1313 is a control module for controlling display on the operating panel 305 of the printer 300 and detecting various key operations. A memory management module 1314 is a control module for performing management such as dynamic allocation to the data memory 314 and the image memory 316.

A power supply control module 1315 is a control module for controlling a power supply to the printer 300, supplying electric power necessary for operation to respective blocks of the hardware, and performing power saving mode control. A near field communication control module 1316 is a control module for communicating with a terminal device such as the smartphone 500 by controlling the near field communication unit 306. A network communication control module 1317 is a control module for controlling the wireless LAN unit 308 so as to perform communication physical layer control for carrying out LAN communication with an external apparatus.

The job management layer 1320 is a module group that executes various operations by using the software 1300 while carrying out allocation of hardware resources, exclusive control, scheduling, and the like in response to a job execution request from a higher layer.

The middleware layer 1330 is located in the middle of the application layer 1340 and the job management layer 1320 and is formed by assembling module groups used in common by functional modules present in the application layer 1340.

An application framework 1331 is a framework module used in common in the case of a job execution request from the application layer 1340 to the job management layer 1320. A network protocol stack 1332 is a module for carrying out communication in accordance with various network protocols including HTTP, TCP/IP, and the like. An encryption processing module 1333 is a module for carrying out encryption and decryption processing necessary for network communication and the like. A web server module 1334 is a module for operating the printer 300 as a web server in order to deliver remote UI contents. The application layer 1340 is an application group that realizes various functions of the printer 300.

A copy application 1341 is an application module for executing a copy operation to read and print the original. A driver printing application 1342 is an application module for executing an operation by receiving jobs from a printer driver of the smartphone 500 or the client terminal 401. The jobs from the printer driver include a print job to execute the printing operation, a scan job to read the original and to output the image data, a maintenance job to perform setting and management of the printer 300 by exchanging information with the external apparatus, and the like. A standard printing application 1343 is an application module that executes an operation by receiving jobs from a standard printing service provided to a system of the smartphone 500.

The jobs from the standard printing service include the print job to execute the printing operation, and the scan job to read the original and to output the image data. However, since the standard printing service is offered by a smartphone manufacturer or a standard OS vendor, there is a restriction that the standard printing service cannot perform setting and management inherent to the type of the printer produced by each manufacturer. A remote UI module 1344 is a module that provides the external apparatus with a remote UI function included in the printer 300 by using the web server module 1334.

The use of the remote UI module 1344 enables the setting and management of the printer 300. In particular, the printer 300 discussed in the present embodiment has limited information that can be set up or displayed on the operating panel 305. Accordingly, the remote UI module 1344 is used for performing more detailed setting and management. On the other hand, in the case where a dedicated driver for the smartphone 500 or the client terminal 401 is not prepared, only the standard printing service is available. In this case, it is necessary to use the remote UI module 1344 in order to perform more detailed setting and management.

Figure 5:
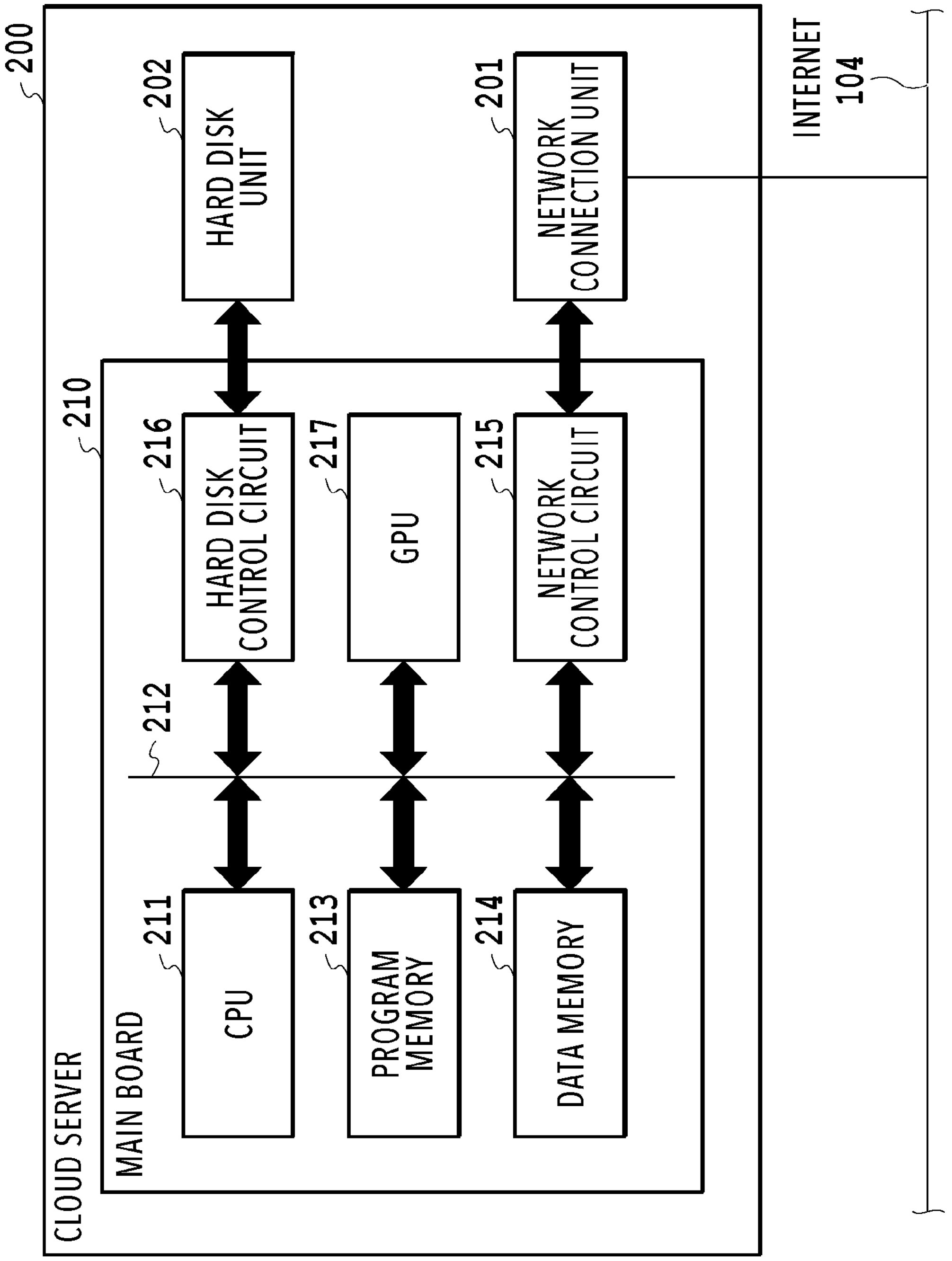
FIG. 5 is a block diagram showing a configuration of a cloud server.

FIG. 5 is a block diagram showing a configuration of the cloud server 200. The cloud server 200 includes a main board 210 that controls the entire apparatus, a network connection unit 201, and a hard disk unit 202. A CPU 211 in the form of a microprocessor embedded on the main board 210 is operated in accordance with a control program stored in a program memory 213 connected through an internal bus 212, and with contents in a data memory 214 connected likewise. The CPU 211 controls the network connection unit 201 through a network control circuit 215, thereby establishing connection to the network such as the Internet 104 and performing communication with a different apparatus. The CPU 211 can write and read data in and out of the hard disk unit 202 connected by way of a hard disk control circuit 216. The hard disk unit 202 stores an operating system used by being loaded in the program memory 213, and control software for the cloud server 200. The hard disk unit 202 also stores various data. A GPU 217 is connected to the main board 210, so that it is possible to cause the GPU 217 to execute a variety of arithmetic processing in place of the CPU 211.

Figure 6:
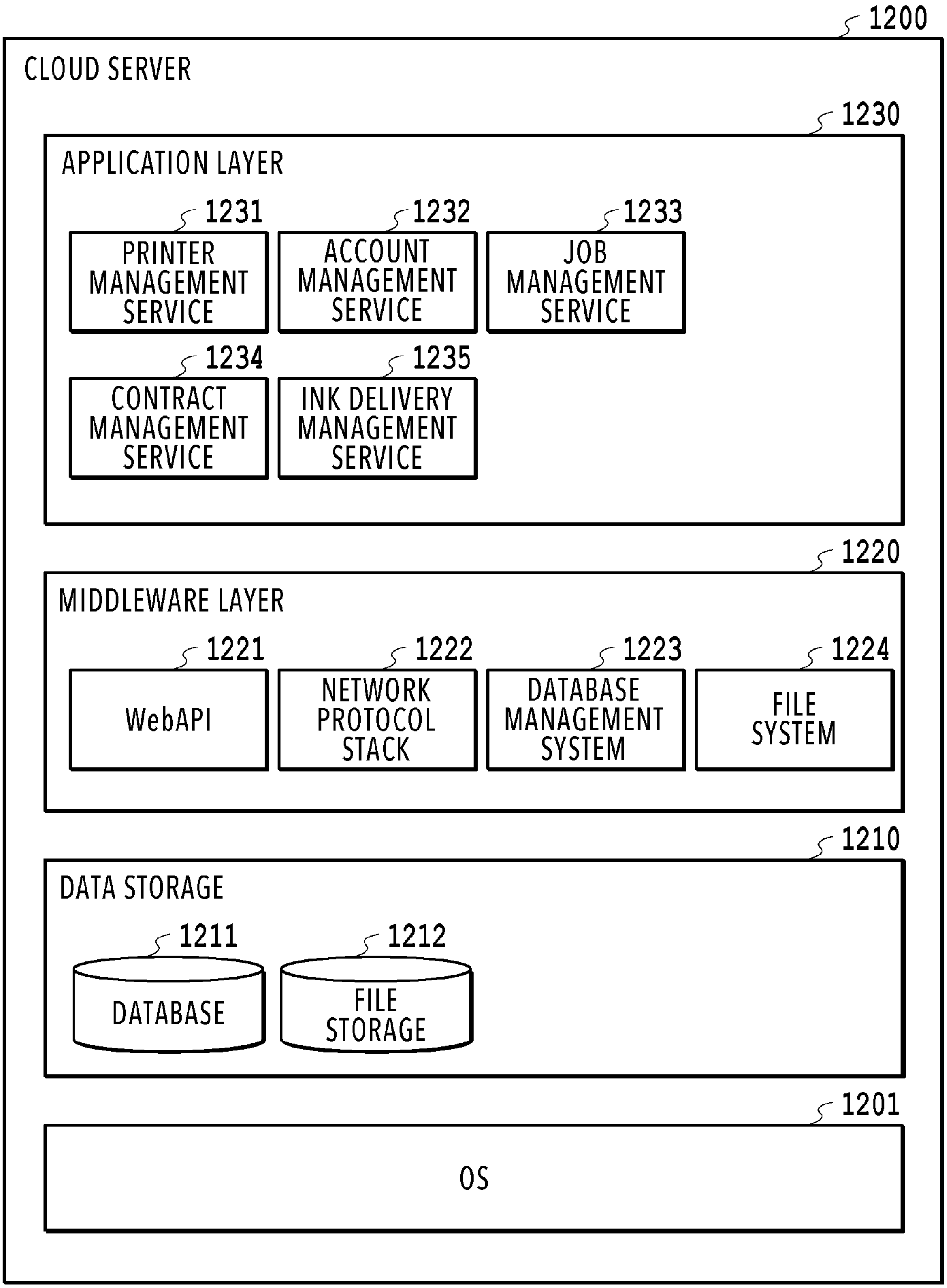
FIG. 6 is a diagram showing a module configuration of software which is operated on the cloud server.

FIG. 6 is a diagram showing a module configuration of software which is operated on the cloud server 200. Software 1200 to be operated on the cloud server 200 is operated on an operating system (OS) 1201. Modules are broadly categorized into a data storage layer 1210, a middleware layer 1220, and an application layer 1230. The modules stored in the hard disk unit 202 are loaded in the program memory 213 and the data memory 214 and are executed as appropriate.

The data storage layer 1210 includes a database and a file storage for storing and managing information used by various services. A database 1211 stores data on a relational database to be managed by a database management system 1223. A file storage 1212 stores files to be managed by a file system 1224. Examples of the files to be stored in the file storage 1212 include image data of a print job to be printed with the printer 300, image data scanned with the printer 300, and the like. The middleware layer 1220 is located below the application layer 1230 and is formed by assembling module groups used in common by application modules present in the application layer 1230.

A network protocol stack 1222 is a module for carrying out communication in accordance with various network protocols including HTTP, TCP/IP, and the like. A web API 1221 is a module for carrying out web API processing of a service provided by the cloud server 200. The web API 1221 is defined as a data structure to be exchanged by using an HTTP protocol. The web API 1221 requests respective modules for various services 1231 to 1235 present in the application layer 1230 to perform processing in accordance with contents of an HTTP request received by using the network protocol stack 1222. The web API 1221 also receives results of processing by the respective requested modules, and performs processing to return a HTTP response to a sender of the request by using the network protocol stack 1222.

The database management system 1223 is a module that provides a management function for access from the various services 1231 to 1235 present in the application layer 1230 to the information in the database 1211. The file system 1224 is a module that provides a management function such as writing and reading files in and out of the file storage 1212 by the various services 1231 to 1235 present in the application layer 1230.

The application layer 1230 is a service group that provides various functions of the cloud server 200. A printer management service 1231 provides a management function concerning information on the registered printer 300. The functions provided by the printer management service 1231 include the following examples, namely, managing notification of status received from the printer 300, issuing an ink delivery request based on the service use contract in a case where ink delivery is necessary depending on the status of the printer 300, managing the number of printed sheets by the printer 300 based on the service use contract and restricting the printing in excess of the upper limit, and so forth.

An account management service 1232 provides a management function concerning information on a registered service user. The functions provided by the account management service 1232 include the following examples, namely, managing the information on the service user, managing a data capacity to be saved in the file storage 1212 based on the service use contract and restricting data saving in a capacity in excess of an upper limit, and so forth. A job management service 1233 provides a management function concerning information on a job for executing a printing operation, a scanning operation, and the like to be carried out by the service user while using the registered printer 300. The functions provided by the job management service 1233 include the following examples, namely, spooling job data into the file storage and notifying the printer 300 upon receipt of a job execution request from the service user, returning information on the job upon receipt of an inquiry from the printer 300, receiving and managing job status notification from the printer 300, deleting the completed file data from the file storage, and so forth.

A contact management service 1234 provides a management function concerning service use contract information on the use of the printer 300 registered by the service user. The functions provided by the contact management service 1234 include managing the information on the service use contract, and so forth. An ink delivery management service 1235 provides a management function concerning information on delivery of the inks being consumable supplies used in the printer 300 from a service provider to the service user based on the service use contract. The functions provided by the ink delivery management service 1235 include the following examples, namely, conducting a necessary procedure for ink delivery to the service user upon receipt of the ink delivery request from the printer management service 1231, managing the information concerning the ink delivery, and so forth.

The present embodiment assumes the case of constructing the cloud server 200 as a single physical server. Instead, the cloud server 200 may be constructed by distributing the above-mentioned modules to two or more physical services. For example, the services 1231 to 1235 on the application layer may be operated in different physical servers, respectively. Alternatively, an application server to provide these services, the database 1211, and the file storage 1212 may be operated by using different physical servers, respectively.

Figure 7A:
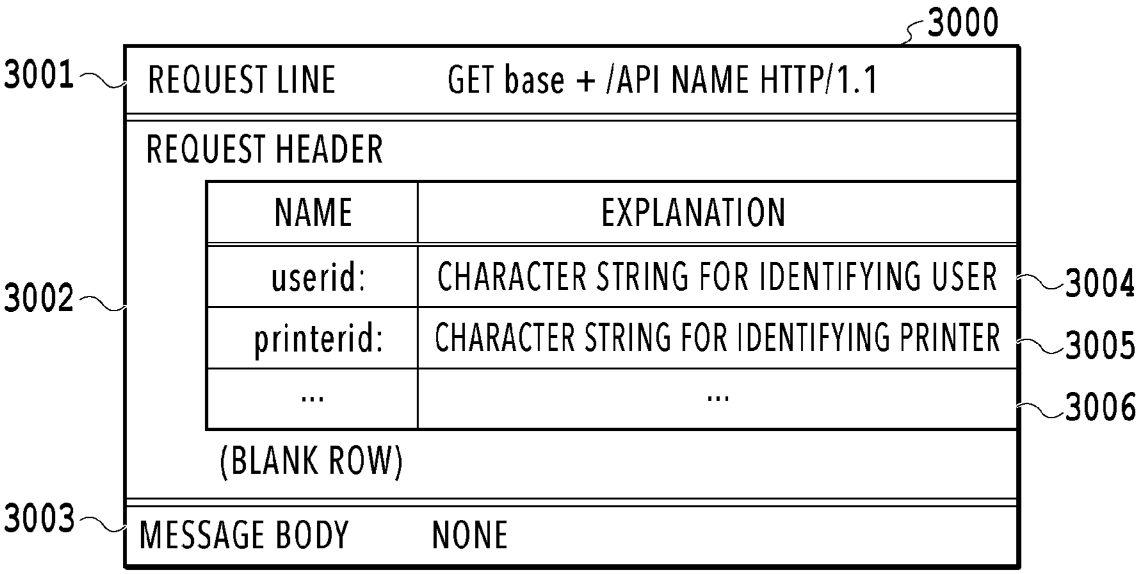
FIG. 7A is a diagram showing a Web API data structure in the cloud server.
Figure 7B:
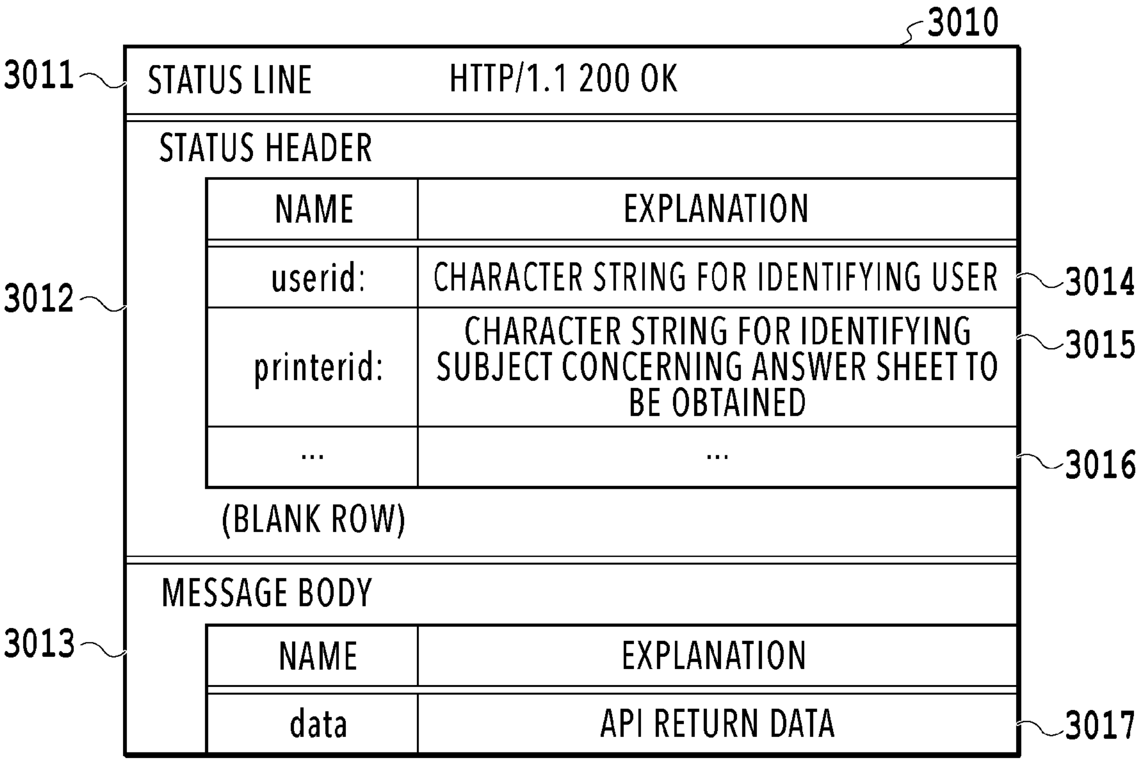
FIG. 7B is a diagram showing another Web API data structure in the cloud server.

FIGS. 7A and 7B are diagrams showing Web API data structures in the cloud server 200. FIG. 7A shows a data structure of an API request 3000. The API request 3000 is transmitted as an HTTP request from the printer 300 to the cloud server 200. The entire API request 3000 is described as text data, and its structure is determined on the row basis while using a line feed code as a delimiter. A first row of the API request 3000 is a request line 3001. The request line 3001 starts with an HTTP method to be requested and is then followed by a URI (universal resource identifier) to identify a requested resource and a version notation of a protocol, and is then terminated with a line feed code.

Here, the URI is formed by coupling "base" being the URI to represent location of the cloud server 200 to an immediately subsequent character string that represents a name of the API request. A request header 3002 includes rows from a row subsequent to the request line 3001 to a row before a first blank row that comes into being. The request header 3002 is used for delivering additional information concerning the request and an HTTP client being a sender of the request to an HTTP server being a destination of the request. Here, a name character string "userid:" is followed by a description of a character string 3004 for identifying the user, and then a name character string "printerid:" is followed by a description of a character string 3005 for identifying the printer, for example.

Moreover, other parameters can also be described on a row 3006 and so on. Rows subsequent to the blank layer following the request header 3002 are called a message body 3003. Depending on the type of the HTTP method to be requested, a body of data to be transferred from the HTTP client to the HTTP server is described in the message body 3003. Here, the message body 3003 may be absent depending on the type of the API.

FIG. 7B shows a data structure of an API response. This data structure is used for returning a response to the API request 3000 as the HTTP response from the cloud server 200 to the printer 300. An entire API request 3010 is described as text data, and its structure is determined on the row basis while using a line feed code as a delimiter. A first row of the API request 3010 is a status line 3011. The status line 3011 starts with a protocol version, in which a status code written in numerals and a character string are terminated with a line feed code.

A status header 3012 includes rows from a row subsequent to the status line 3011 to a row before a first blank row that comes into being. The status header 3012 is used for delivering additional information, which concerns a status as well as data to be delivered by using a message body 3013 included in the HTTP response, to the HTTP client being the sender of the request. Here, a name character string "userid:" is followed by a description of a character string 3014 for identifying the user, and then a name character string "printerid:" is followed by a description of a character string 3015 for identifying the printer, for example. Moreover, other parameters can also be described on a row 3016 and so on.

Rows subsequent to the blank layer following the status header 3012 are called the message body 3013. A body of data to be transferred from the HTTP server to the HTTP client is described in the message body 3013. Here, a case of storing API return data 3017 is shown as an example. However, the message body 3013 may be absent depending on the type of the API.

FIGS. 8A to 8E are diagrams showing data structures of records to be stored in a database of the cloud server 200. A data structure of each table is defined by lumping attribute values together. The attributes include a main key that uniquely identifies a record stored in a table, and an external key for referring to a record in a different table. Here, the data structure is illustrated by dividing the structure into upper and lower frames, and the main key is described in an upper box while the attributes including the external keys are described in a lower box.

FIG. 8A is a diagram showing a data structure of a user information record 3100 to be stored in a user information table. User ID 3101 is the main key that can uniquely identify a desired record out of records stored in the user information table. User detail information 3102 stores attribute information such as address, name, and age of the user. Current period upper limit storage capacity 3103 stores an upper limit of the storage capacity for the user in a current period. Current period used storage capacity 3104 stores a used storage capacity in the current period by the user. The current period is a management period determined based on the contract, which is managed based on a predetermined period such as a monthly basis and a yearly basis.

A value of a memory capacity upper limit value 3137 in a contract information record 3130 to be described later is set for each management period in the current period upper limit storage capacity 3103. This value can be increased or decreased within the relevant period depending on a status of use of services. In this way, it is possible to allow the user to temporarily exceed the storage capacity determined in the contract. In the case where the current period used storage capacity 3104 exceeds the current period upper limit storage capacity 3103, the relevant user cannot store any more data in the cloud server 200. Currently owned point 3105 stores information on points owned by the user. The points are provided in accordance with the number of printed sheets or the ink consumption. The user can enjoy various services by using the granted points. For example, the user can employ the points to pay for billing concerning the contract or to pay for goods sold by a service provider.

FIG. 8B is a diagram showing a data structure of a printer information record 3110 to be stored in a printer information table. Printer ID 3111 is the main key that can uniquely identify a desired record out of records stored in the printer information table. Printer status 3112 stores information such as information indicating whether or not an error is occurring in the printer 300, and information such as a type of the error in the case where the error is occurring. Ink remaining amount 3113 stores information on remaining amounts of the inks in the printer 300. In the case where a remaining amount of one of the inks is equal to or below a predetermined amount, an alarm will be issued or an operation is suspended due to the error.

Current period printed sheet quantity 3114 stores the number of sheets printed in the current period by the relevant printer 300. Current period upper limit printed sheet quantity 3115 stores an upper limit of the number of printed sheets in the current period by the relevant printer 300. A value of a printed sheet quantity upper limit value 3136 in the contract information record 3130 to be described later is set for each management period in the current period upper limit printed sheet quantity 3115. This value can be increased or decreased within the relevant period depending on the status of use of services. In this way, it is possible to allow the user to temporarily exceed the number of printed sheets determined in the contract. In the case where the current period printed sheet quantity 3114 exceeds the current period upper limit printed sheet quantity 3115, the relevant user cannot execute any more printing by using the relevant printer 300.

FIG. 8C is a diagram showing a data structure of a job information record 3120 to be stored in a job information table. Job ID 3121 is the main key that can uniquely identify a desired record out of records stored in the job information table. User ID 3122 is the external key used for identifying the user who requests the job and for referring to the information on the user in the user information table. Printer ID 3123 is the external key used for identifying the printer 300 supposed to execute the job and for referring to the information on the printer 300 in the printer information table.

Job status information 3124 stores current status information concerning the relevant job. The status may have any of values representing standing by for printing, currently printing, printing completed, alternate printing completed, and the like. Printing parameter setting 3125 stores parameter information to designate printing conditions used in the relevant job. This information can contain information such as a sheet size, a sheet type, and an ink type to be used. Print job data 3126 stores information that identifies print image data to be printed in the relevant job. This information is formed from information on presence of the job stored in the file storage 1212, and the like. Reprinting flag 3127 indicates whether or not the relevant job is targeted for reprinting. This flag is set in the case where reprinting is required after carrying out the alternate printing, and is cleared in the case where the reprinting is completed.

FIG. 8D is a diagram showing a data structure of a contract information record 3130 to be stored in a contract information table. Contract ID 3131 is the main key that can uniquely identify a desired record out of records stored in the contract information table. User ID 3132 is the external key used for identifying the user targeted for the contract and for referring to the information on the user in the user information table. Printer ID 3133 is the external key used for identifying the printer targeted for the contract and for referring to the information on the printer in the printer information table.

Contract type 3134 stores a type of the relevant contract. Examples of the type of the contract include a pay-as-you-go contract, a flat rate contract, a delivery contract, and the like. The pay-as-you-go contract is a contract that charges a fee depending on amount of use of the printer. In other words, this contract charges the fee depending on the number of printed sheets or amounts of consumption of the consumable supplies. The flat rate contract is a contract that charges a fixed fee for each predetermined period irrespective of the amount of use of the printer. This is a contract that sets up an upper limit of the number of printed sheets for each predetermined period or sets up a limit of the storage capacity of the print data to be stored in the cloud server 200. According to this contract, the user can use the printer as much as possible within such ranges of limits. The delivery contract is a contract with which the consumable supplies such as the inks are automatically delivered in the case where those supplies are running out, and the user is liable to pay for an amount of purchase corresponding to the ordered consumable supplies. Note that the types of the contracts described herein are mere examples, and other modes of use may be provided based on other contracts.

Contract information detail 3135 stores detailed information concerning the relevant contract. Information such as a contract period, use conditions, and a money amount can be included in the detail information. The printed sheet quantity upper limit value 3136 stores an upper limit number of the printed sheets on the contract with the printer 300 involved in the contract. The memory capacity upper limit value 3137 stores an upper limit storage capacity on the contract of the user involved in the contract.

FIG. 8E is a diagram showing a data structure of a delivery information record 3140 to be stored in a delivery information table. Order placement ID 3141 is the main key that can uniquely identify a desired record out of records stored in the delivery information table. Contract ID 3142 is the external key used for identifying the contract that forms the basis of delivery and for referring to the information on the contract in the contract information table. Order placement detail information 3143 stores detailed information concerning the relevant delivery. The detailed information includes information on the ink type, quantity, and the like. Order placement date 3144 stores date of arrangement of the delivery. Expected delivery date 3145 stores expected date of arrival of the goods arranged for the delivery to the user.

Figure 9:
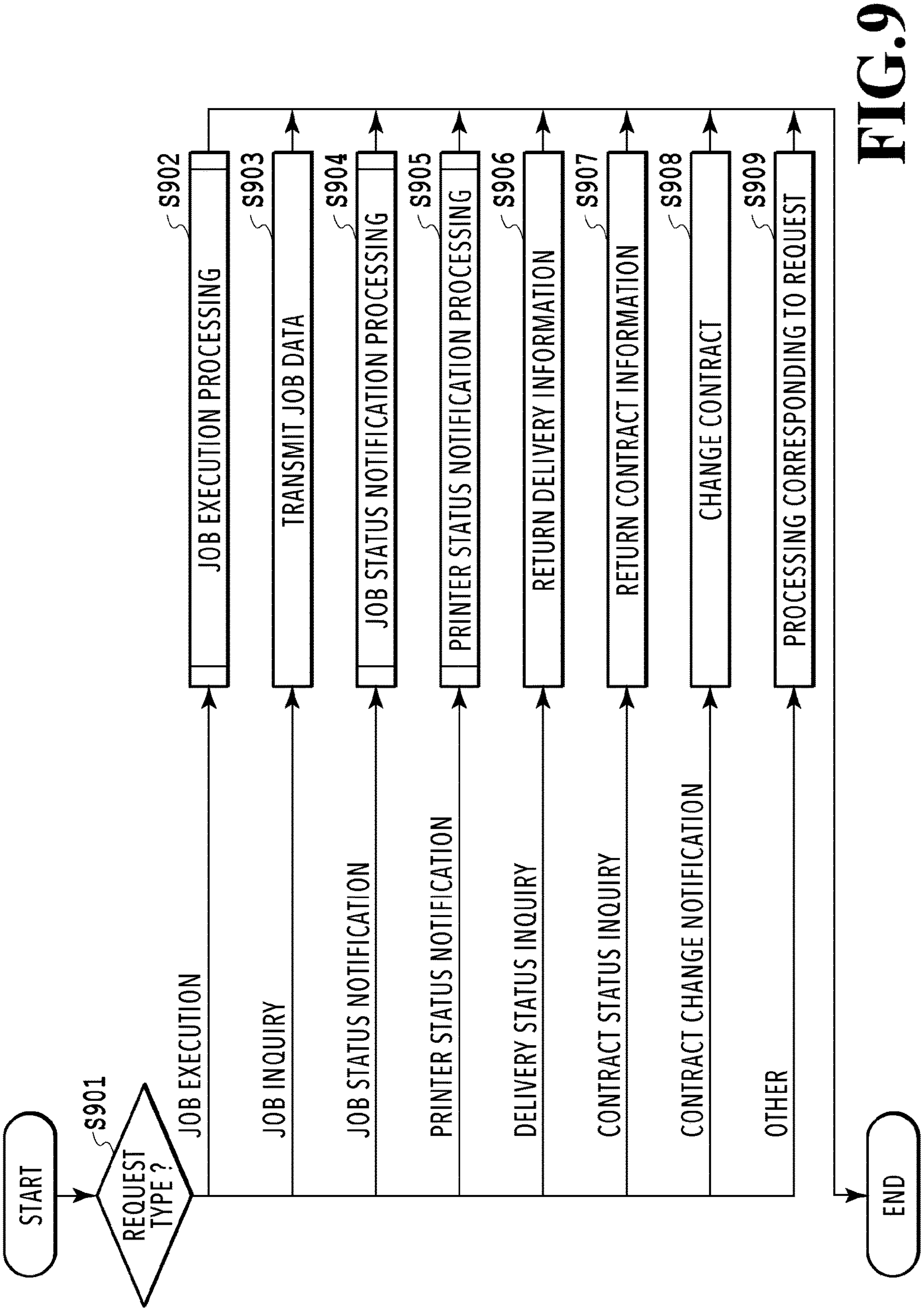
FIG. 9 is a flowchart showing request processing by the cloud server.

FIG. 9 is a flowchart showing request processing by the cloud server 200. This request processing is executed by the CPU 211 of the cloud server 200 every time the cloud server 200 receives a request for the Web API from outside. The request processing by the cloud server 200 of the present embodiment will be described below with reference to this flowchart. Note that a series of processing shown in FIG. 9 takes place by causing the CPU 211 of the cloud server 200 to load program codes stored in the program memory 213 into the data memory 214 and then to execute the program codes. Alternatively, functions of part or all of steps in FIG. 9 may be realized by using hardware such as an ASIC and an electronic circuit. Here, code "S" used in the description of each processing represents a step in the corresponding flowchart.

In the case where the respect processing is started, the CPU 211 of the cloud server 200 receives the Web API request and determines a type of the received Web API request in S901. Subsequently, processing corresponding to the types of the Web API request will be carried out in the respective steps.

In the case where the request represents job execution from a user terminal in S901, the CPU 211 proceeds to S902 and carries out job execution processing to be described later. In the case where the request represents job inquiry from the printer 300 in S901, the CPU 211 proceeds to S903 and transmits job data in the case where the job for the printer 300 is present. As for the transmission of the job data in this case, the spooled job data may be directly returned as a response to the Web API, or URL indicating the spooled job data may be returned as the response.

In the case where the request represents job status notification from the printer 300 in S901, the CPU 211 proceeds to S904 and carries out job status notification processing to be described later. In the case where the request represents printer status notification from the printer 300 in S901, the CPU 211 proceeds to S905 and carries out printer status notification processing to be described later. In the case where the request represents delivery status inquiry in S901, the CPU 211 proceeds to S906 to obtain the corresponding delivery information record 3140 from the database 1211, and returns the delivery information record 3140 as a Web API response.

In the case where the request represents contract status inquiry in S901, the CPU 211 proceeds to S907 to obtain the corresponding contract information record 3130 from the database 1211, and returns the contract information record 3130 as the Web API response. In the case where the request represents contract change notification in S901, the CPU 211 proceeds to S908 and updates the contract information detail 3135 in the contract information record 3130 stored in the database 1211. In the case where the request represents any other request in S901, the CPU 211 proceeds to S909 and carries out appropriate processing. Detailed explanations of such appropriate processing will be omitted herein.

Figure 10:
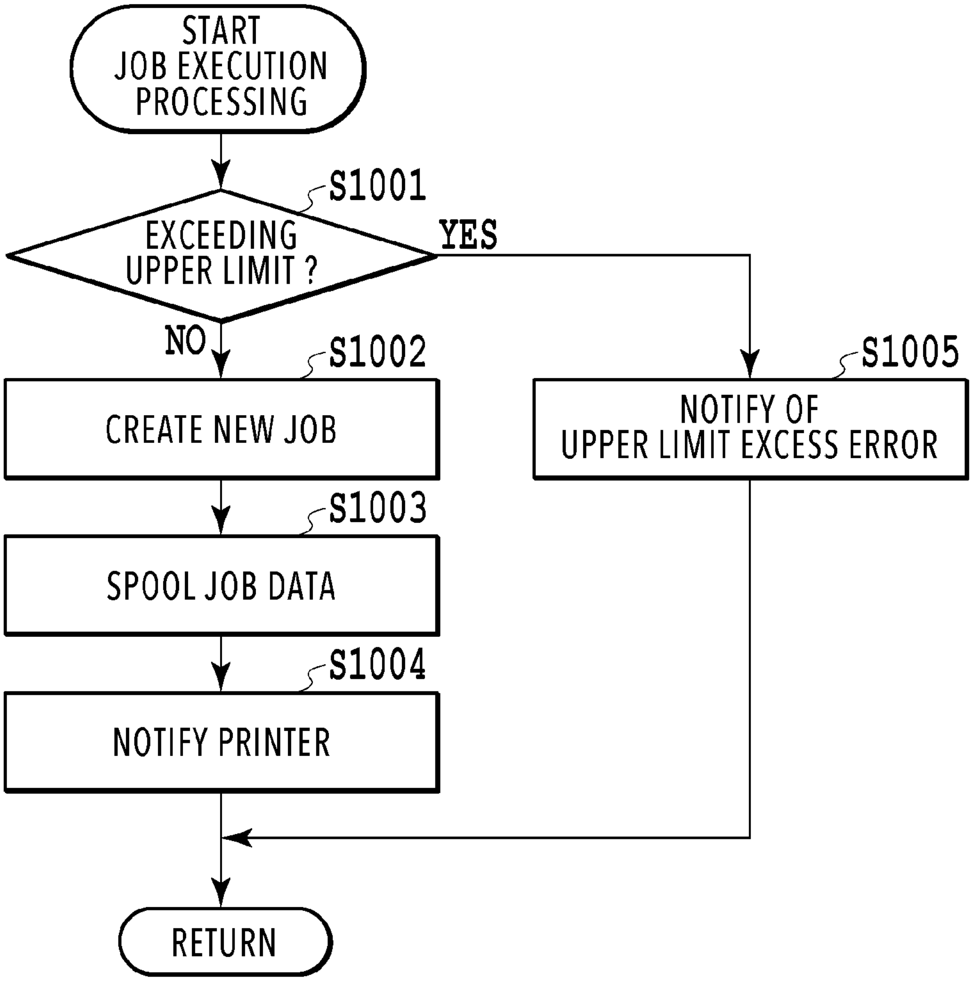
FIG. 10 is a flowchart showing processing by the cloud server in a case of reception of a request.

FIG. 10 is a flowchart of a sub-flow of the job execution processing in S902 of FIG. 9, which shows contents of the processing by the cloud server 200 at the time of reception of the request. This processing is executed by the CPU 211 of the cloud server 200 in the case where the request represents the job execution from the user terminal.

In the case where the cloud server 200 receives the job execution request, the CPU 211 determines whether or not the number of printed sheets in the current period exceeds the upper limit number of sheets in S1001. This determination is made by referring to the printer information record 3110 and checking whether or not the current period printed sheet quantity 3114 exceeds the current period upper limit printed sheet quantity 3115. In the case where the current period printed sheet quantity 3114 does not exceed the current period upper limit printed sheet quantity 3115, the CPU 211 proceeds to S1002 and creates a new job. In the case where the current period printed sheet quantity 3114 exceeds the current period upper limit printed sheet quantity 3115 in S1001, the CPU 211 proceeds to S1005 to return an upper limit excess error as the Web API response, and then terminates the processing.

After the new job is created in S1002, the CPU 211 spools the data on the accepted job into the file storage 1212 in S1003. Then, the CPU 211 notifies the printer 300 of registration of the new job in S1004, and terminates the job execution processing.

Figure 11:
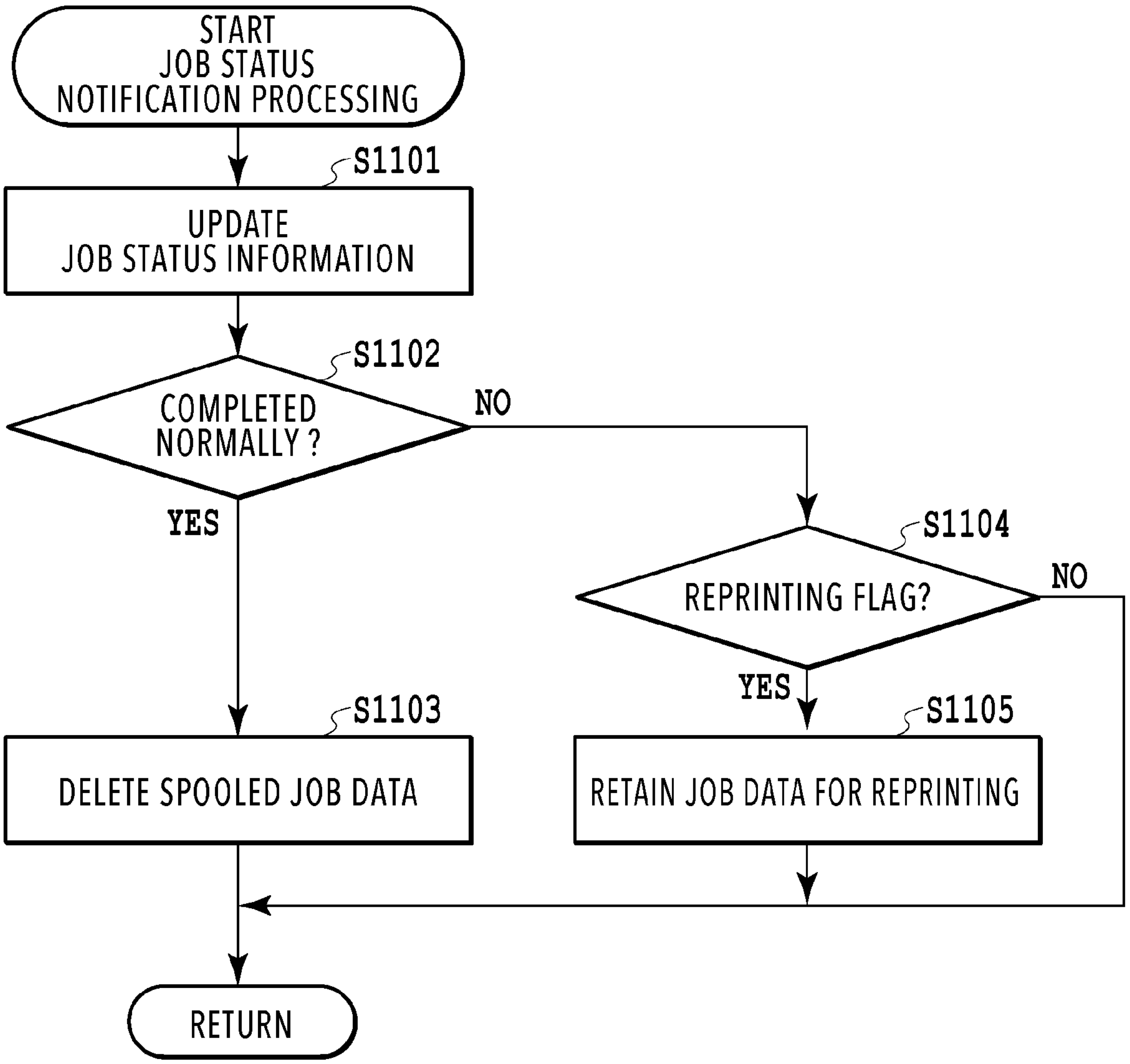
FIG. 11 is a flowchart showing processing by the cloud server in a case of reception of a job status notification request.

FIG. 11 is a flowchart of a sub-flow of the job status notification processing in S904 of FIG. 9, which shows contents of the processing by the cloud server 200 at the time of reception of the job status notification request. This processing is executed by the CPU 211 of the cloud server 200 in the case where the request represents the job status notification from the printer 300.

In the case where the cloud server 200 receives the job status notification request, the CPU 211 updates the information in the corresponding job information record 3120 in the database 1211 in S1101. Subsequently, in S1102, the CPU 211 refers to the notified job status information and determines whether or not the notification notifies of normal termination of the job. In the case of the normal termination, the CPU 211 proceeds to S1103 and deletes the job data on the corresponding job spooled in the file storage 1212. On the other hand, in the case other than the normal termination in S1102, the CPU 211 determines whether or not a reprinting flag 3127 for the corresponding job information record 3120 is set in S1104.

In the case where the reprinting flag 3127 is set, the CPU 211 proceeds to S1105 and retains the job data for reprinting. A reprinting job retained herein is executed again after recovery of a normal state by refilling with the consumable supplies such as the inks and the sheets.

Figure 12:
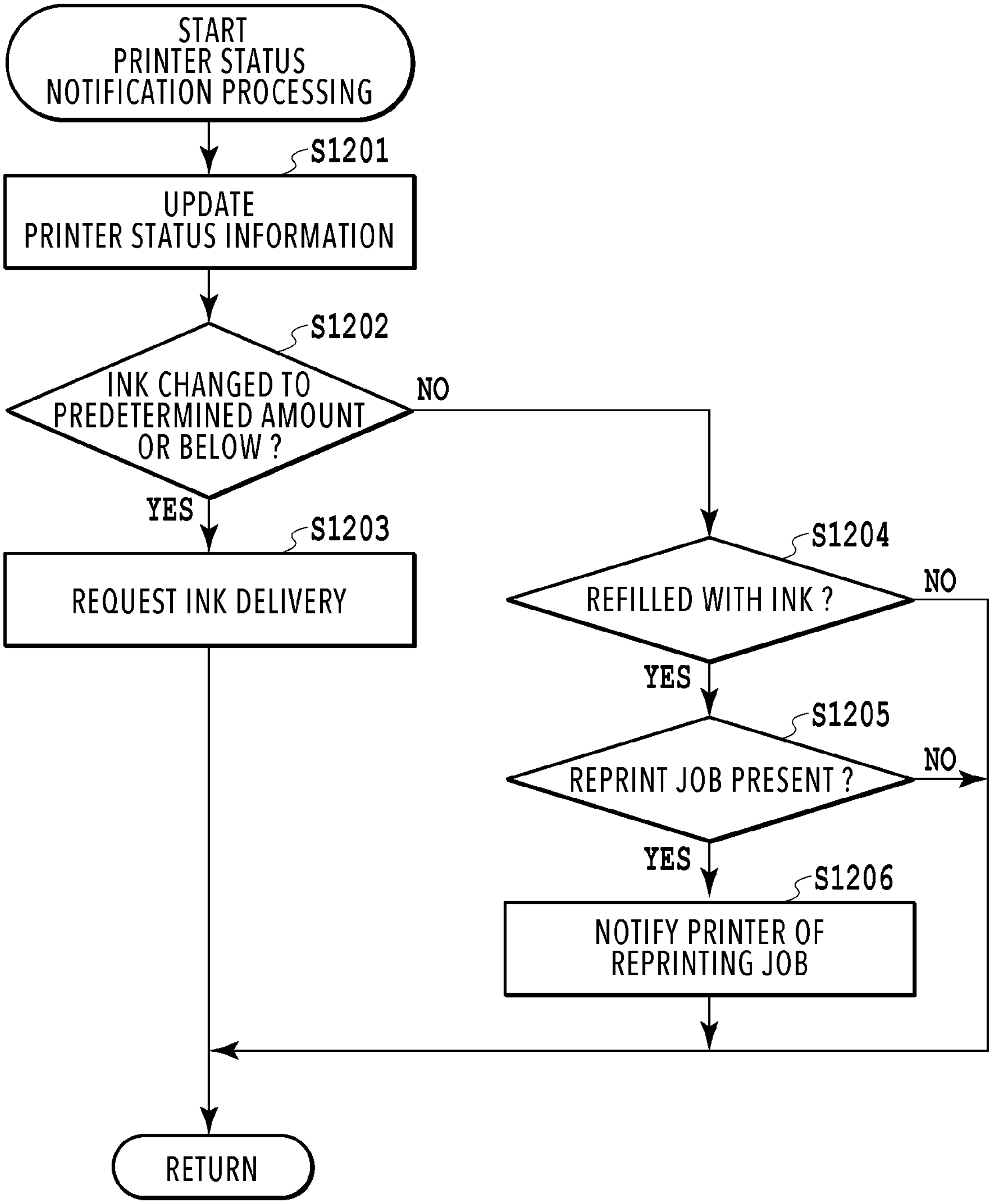
FIG. 12 is a flowchart showing processing by the cloud server in a case of reception of a printer status notification request.

FIG. 12 is a flowchart of a sub-flow of the printer status notification processing in S905 of FIG. 9, which shows contents of the processing by the cloud server 200 at the time of reception of the printer status notification request. This processing is executed by the CPU 211 of the cloud server 200 in the case where the request represents the printer status notification from the printer 300.

In the case where the cloud server 200 receives the printer status notification request, the CPU 211 updates the information in the corresponding printer information record 3110 in the database 1211 in S1201. Subsequently, in S1202, the CPU 211 determines whether or not ink remaining amount 3113 is changed to a predetermined amount or below. To this end, the ink remaining amount 3113 in the printer information record 3110 before the updating may be compared with the ink remaining amount 3113 in the printer information record 3110 after the updating, and a determination may be made as to whether or not the ink remaining amount 3113 is changed from the predetermined amount or above to the predetermined amount or below. Here, the predetermined amount may be a fixed amount determined in advance or may be variable depending on the user or the contract. Alternatively, the predetermined amount may be set up by the user.

In S1202, the CPU 211 proceeds to S1203 in the case where the ink is changed to the predetermined amount or below, and requests the ink delivery management service 1235 to deliver the ink. On the other hand, in the case where the ink is equal to or below the predetermined amount in S1202, the CPU 211 determines in S1204 as to whether or not the ink refilling is carried out. To this end, the ink remaining amount 3113 in the printer information record 3110 before the updating may be compared with the ink remaining amount 3113 in the printer information record 3110 after the updating, and a determination may be made as to whether or not the ink remaining amount 3113 is changed from the predetermined amount or below to the predetermined amount or above. In the case of the determination that the ink refilling is carried out, the CPU 211 proceeds to S1205 and determines whether or not there is a job designated to the printer 300 for reprinting. In the case where there is the reprinting job, the CPU 211 proceeds to S1206 to notify the printer 300 of the reprinting job, and then terminates the processing. The processing is terminated in the case of the determination in S1204 that the ink refilling is not carried out, and in the case where there is no reprinting job in S1205.

Figure 13:
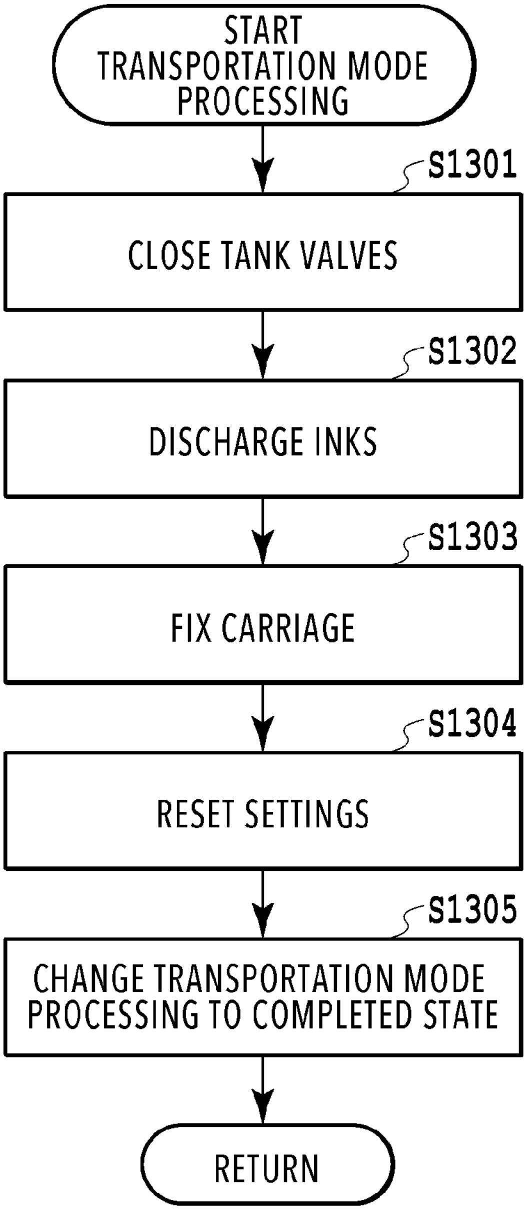
FIG. 13 is a flowchart showing contents of transportation mode processing (a transportation preparatory operation)

FIG. 13 is a flowchart showing contents of transportation mode processing (a transportation preparatory operation) for changing the printer 300 from a normal printing mode to a transportation mode. Here, the transportation mode is a state after subjecting the printer 300 to a preparatory operation for transportation, and this mode is distinguished from the normal printing mode to carry out normal printing. In the normal printing mode, the print head 602 can eject the inks and the carriage 605 can travel right and left along the carriage support portion 604. In the transportation mode, the ink supply to the print head 602 is stopped by closing the valves, the inks in the print head 602 are discharged, and the carriage 605 is fixed.

In the case where the printer 300 is returned and transported in the state other than the transportation mode, the inks may leak out or user setting information may remain in the printing apparatus. As a consequence, it may not be possible to start using the printer 300 in this state. Specifically, an operation to clean portions of leakage of the inks and an operation to delete the user setting information need to be carried out before starting the reuse of the printer 300.

In this regard, setting the printer 300 to the transportation mode in the case of transporting the printer 300 makes it possible to suppress the ink leakage during packing work and transportation as well as the leakage of user setting information in the printing apparatus. The transportation mode processing is realized by causing the CPU 311 to load a program stored in the program memory 313 into the data memory 314 and then to execute the program.

In the case where the transportation mode processing is started, the CPU 311 closes the tank valves 608 (see FIG. 2) in step S1301 (a closing action). By closing the tank valves 608, it is possible to stop the ink supply from the built-in ink tanks 601 to the print head 602, thereby preventing the leakage of the inks from the print head 602. Here, a method of closing the tank valves 608 may be a method of causing the printer 300 to close the valves automatically by using a motor or the like, or a method of causing the CPU 311 to display a screen shown in FIG. 16A to be described later on the operating panel 305 of the printer 300 so as to let the user close the valves manually.

Thereafter, in S1302, the CPU 311 discharges the inks from the print head 602 and the ink tubes 603 to the cap 606 (a discharging action). By discharging the inks from the print head 602 and the ink tubes 603 as described above, it is possible to suppress the leakage of the inks from the print head 602 in the case where the housing is tilted or vibration is applied during the transportation of the printer 300. Next, the CPU 311 fixes the carriage 605 (a fixing action) in S1303. By moving the carriage 605 to a position opposed to the cap 606 and lifting up the carriage lock pin 607 having the convex shape, the member having the concave shape and being present on the back surface of the carriage 605 is engaged with the carriage lock pin 607, thereby fixing the carriage 605. In this state, it is possible to maintain the state of close contact of the cap 606 with the print head 602 even in the case where the housing is tilted or the vibration is applied during the transportation of the printer 300, for example.

Then, in S1304, the CPU 311 brings the user setting information stored in the printer 300 back to a state of factory shipment (a resetting action). This makes it possible to prevent the leakage of the user setting information in the printer 300. The user setting information may contain information necessary for operating the printer 300. This is why the user setting information is brought back to the state of factory shipment after completion of the processing of the respective units (such as a valve closing action and a carriage locking action) in the transportation mode processing. Thereafter, in S1305, the CPU 311 changes the status of the transportation mode processing to a completed state and then terminates the processing. To be more precise, the CPU 311 stores information (a flag), which indicates that the transportation mode processing has been carried out, into the data memory 314.

As described above, in the transportation mode processing, the printer 300 automatically executes the processing that can be executed automatically. On the other hand, the contents of the processing are displayed on the operating panel 305 in the case of causing the user to execute the processing manually. Hence, the user carries out the processing.

The transportation mode processing of the present embodiment includes the action to close the valves, the action to discharge the inks, the action to lock the carriage, and the action to reset the user setting as described above. However, the present invention is not limited only to this configuration. For example, the transportation mode processing may include other actions such as an action to fix a movable portion other than the carriage.

Figure 14:
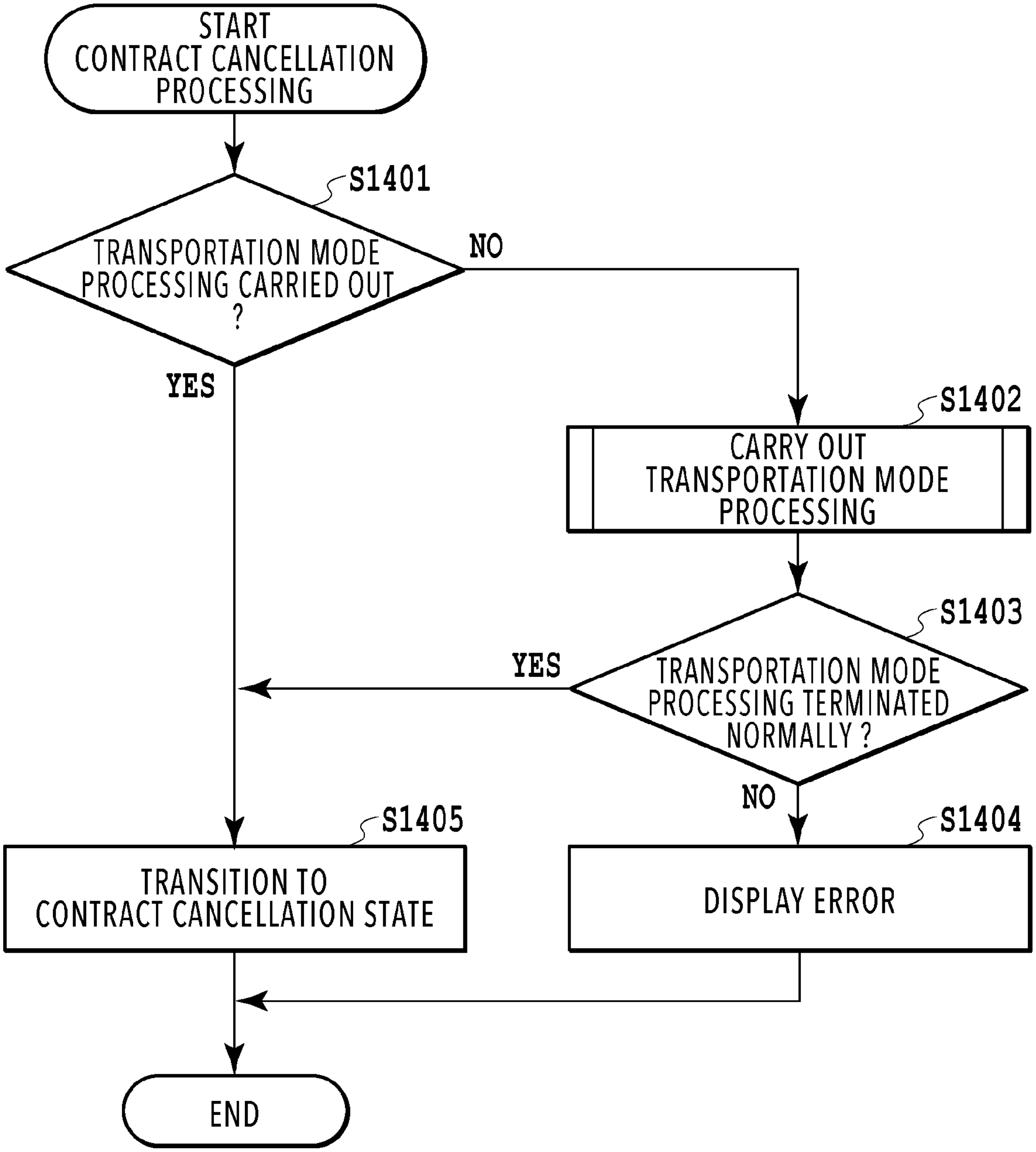
FIG. 14 is a flowchart showing contents of service contract cancellation processing.

FIG. 14 is a flowchart showing contents of service contract cancellation processing. The service contract cancellation processing is processing to be carried out in the case where the service user cancels the contract based on the intention of the service user. This processing is carried out in the case where the printer 300 receives notification of cancellation of the contract from the cloud server 200. The contract cancellation processing is realized by causing the CPU 311 to load a program stored in the program memory 313 into the data memory 314 and then to execute the program. Here, cancellation of the contract includes both cancellation in the middle of the contract and cancellation at expiration of a contract period.

In the case where the contract cancellation processing is started, the CPU 311 determines whether or not the transportation mode processing of the printer 300 has been carried out in S1401. To be more precise, the determination is made based on whether or not information (a flag) indicating that the transportation mode processing has been carried out is stored in the data memory 314. In the case where the transportation mode processing has been carried out, the CPU 311 proceeds to S1405 and causes the state of the printer 300 to transition to a contract cancellation state. On the other hand, in the case where the transportation mode processing is yet to be executed in S1401, the CPU 311 proceeds to S1402 and carries out the transportation mode processing described with reference to FIG. 13. In subsequent S1403, the CPU 311 determines whether or not the transportation mode processing in S1402 has been normally terminated. In the case where the processing is normally terminated, the CPU 311 proceeds to S1405 to transition to the contract cancellation state. In the case where the transportation mode processing in S1402 is not normally terminated, the CPU 311 proceeds to S1404 to cause the operating panel 305 of the printer 300 to display an error screen shown in FIG. 16B to be described later. Then, the CPU 311 terminates the processing without transitioning to the contract cancellation state.

As described above, the CPU 311 checks in the contract cancellation processing as to whether or not the transportation mode processing has been carried out, and then carries out the transportation mode processing in the case where the transportation mode processing is yet to be carried out. In this way, the printer 300 completes the transportation mode processing as a consequence of completion of the contract cancellation processing, so that the ink leakage during the packing work in preparation for transportation and in the course of transportation, and the leakage of user setting information in the printing apparatus can be suppressed.

Figure 15:
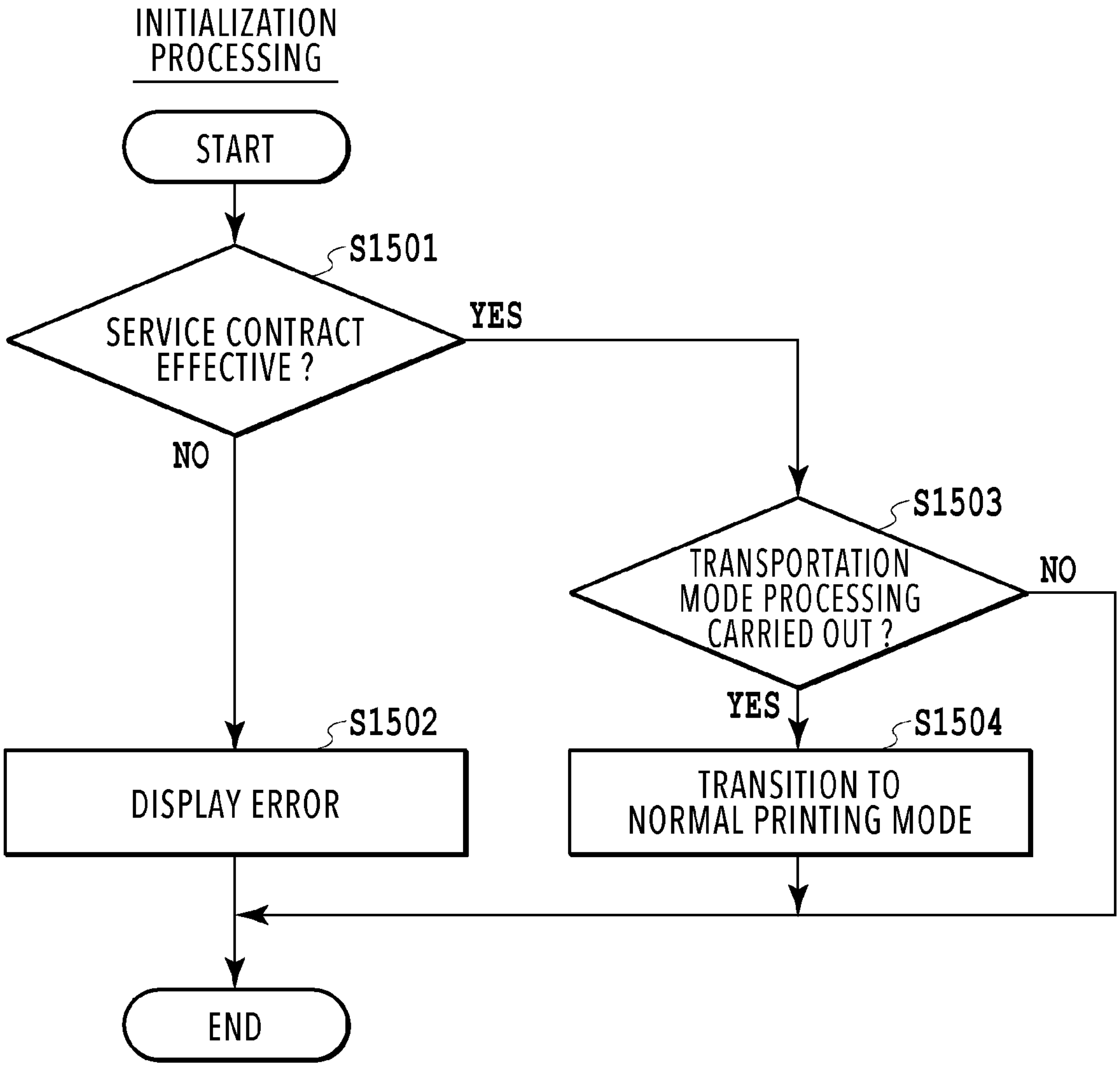
FIG. 15 is a flowchart of initialization processing to be executed by the printer.

FIG. 15 is a flowchart of initialization processing to be executed by the printer 300. After completion of the initialization processing, the printer 300 can function as the printer that can perform printing. The initialization processing is realized by causing the CPU 311 to load a program stored in the program memory 313 into the data memory 314 and then to execute the program. The initialization processing is carried out in the case of starting the use of the printer 300 after purchase, in the case of starting the reuse after the transportation, and the like.

In the case where the initialization processing is started, the CPU 311 determines whether or not a service contract involving the printer 300 is effective (a contract determination) in S1501. In the case where the service contract is discontinued, the CPU 311 proceeds to S1502 and causes the operating panel 305 of the printer 300 to display an error screen shown in FIG. 16C or 16D to be described later. On the other hand, in the case where it is determined in S1501 that the service contract is effective, the CPU 311 proceeds to S1503 and determines whether or not the transportation mode processing is executed. In the case where the transportation mode processing is not executed, the printer 300 is set to the normal printing mode, and the CPU 311 terminates the initialization processing accordingly.

In the case where the transportation mode processing has been executed in S1503, the CPU 311 proceeds to S1504 and causes the status of the printer 300 to transition from the transportation mode to the normal printing mode so as to establish the state of being capable of printing. In the present embodiment, the tank valves 608 are opened in order to enable the print head 602 to eject the inks, so that the inks can be supplied from the built-in ink tank 601. Meanwhile, the convex-shaped carriage lock pin 607 is lowered so as to enable the carriage 605 to travel along the carriage support portion 604.

Figure 16A:
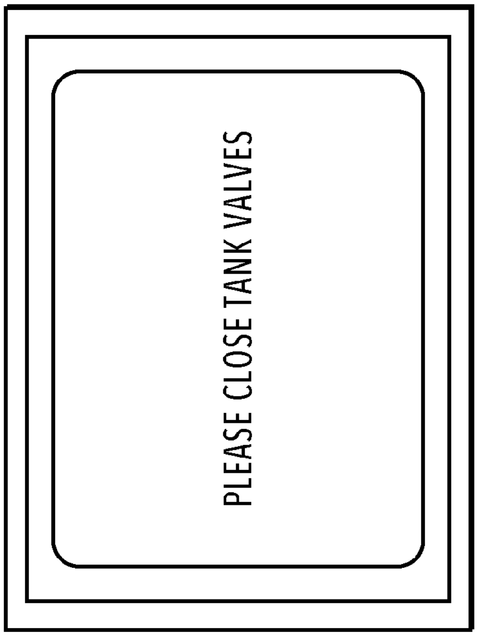
FIG. 16A is a schematic diagram showing a display screen to be displayed on an operating panel of the printer.
Figure 16B:
FIG. 16B is a schematic diagram showing another display screen to be displayed on the operating panel of the printer.
Figure 16C:
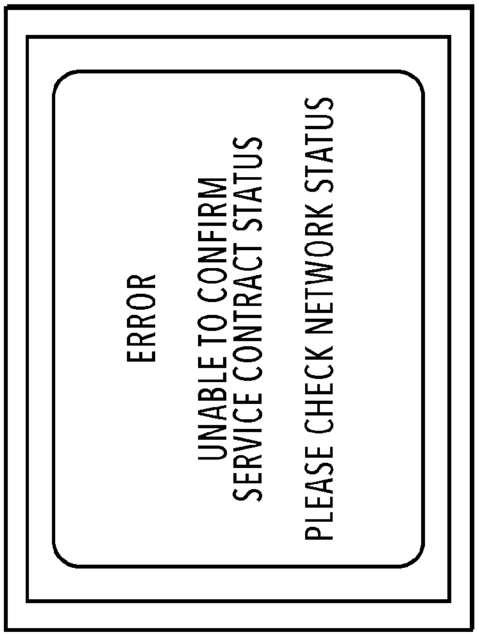
FIG. 16C is a schematic diagram showing another display screen to be displayed on the operating panel of the printer.
Figure 16D:
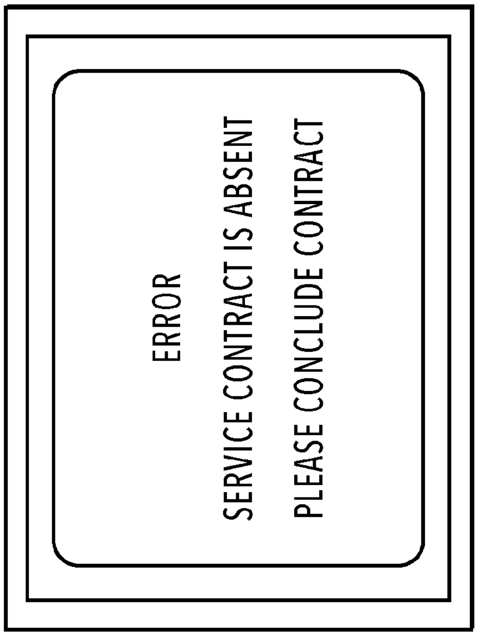
FIG. 16D is a schematic diagram showing another display screen to be displayed on the operating panel of the printer.

FIGS. 16A to 16D are schematic diagrams showing display screens to be displayed on the operating panel 305 of the printer 300. FIG. 16A is a screen to be displayed on the operating panel 305 of the printer 300 in the case of causing the user to manually close the tank valves 608. FIG. 16B is a screen to be displayed on the operating panel 305 of the printer 300 in the case where the transportation mode processing is not normally terminated. Each of FIGS. 16C and 16D is a screen to be displayed on the operating panel 305 of the printer 300 in the case where the determination is made as to whether or not the service contract involving the printer 300 is effective and it is determined that the service contract is not effective.

The present embodiment has explained the example in which the transportation mode processing is executed in the contract cancellation processing. However, the present invention is not limited only to this configuration. The present invention may be configured to enable the user to carry out the transportation mode processing by pressing a button and the like provided to the printer 300.

As described above, the transportation preparatory operation being the preparatory operation to be carried out before the transportation is executed based on the cancellation of the contract by the user. In this way, it is possible to provide the printing apparatus, the method of controlling the printing apparatus, the printing system, and the program, which are capable of suppressing the ink leakage during packing work and transportation in the case of transporting the printing apparatus and the leakage of the user setting information in the printing apparatus after cancellation of the service contract involving the printing apparatus.

Second Embodiment

A second embodiment of the present invention will be described below with reference to the drawings. Note that a basic configuration of the present embodiment is the same as the first embodiment. Therefore, characteristic configurations of the present invention will be described below.

Figure 17:
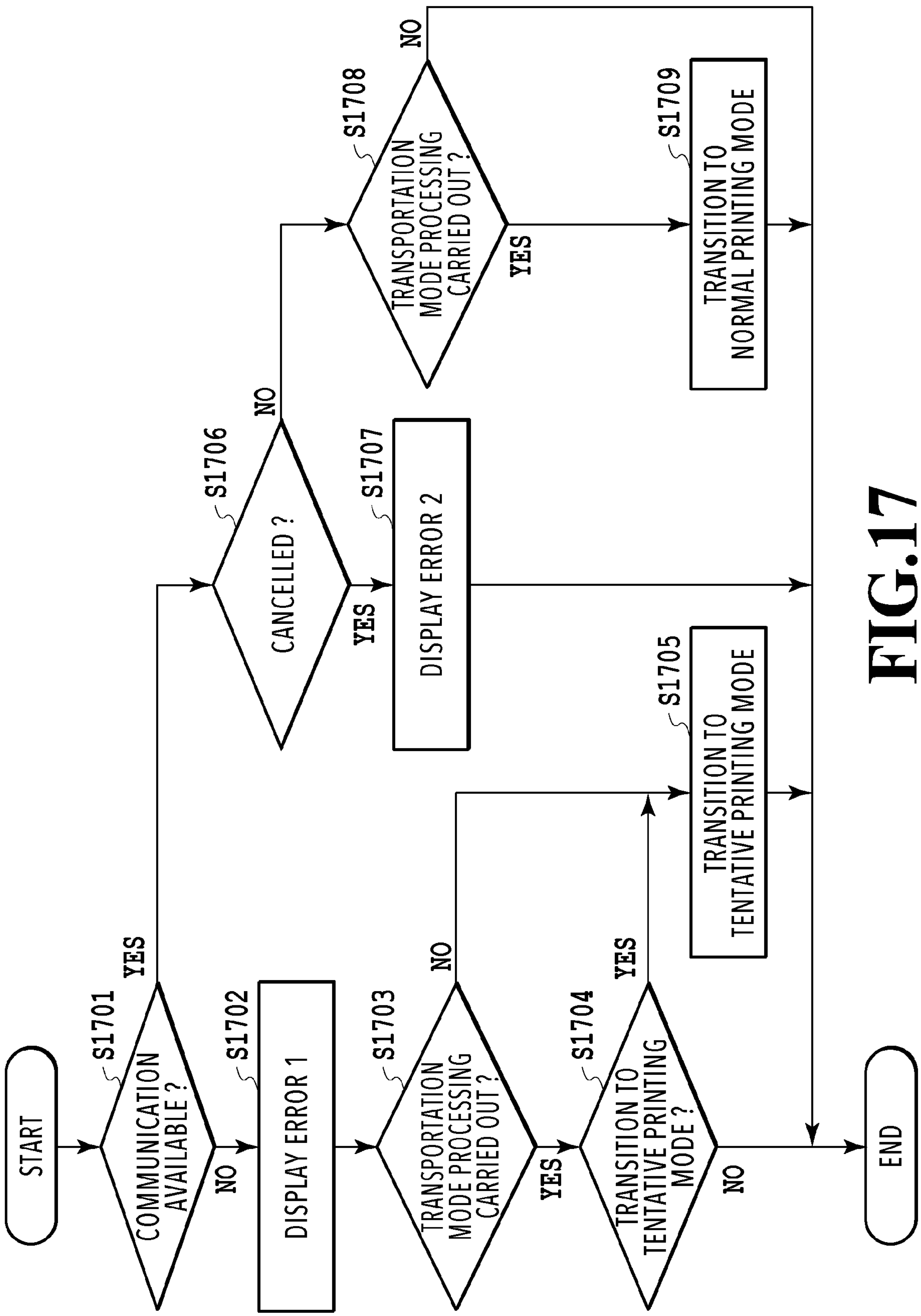
FIG. 17 is a flowchart showing initialization processing to be executed by the printer.

FIG. 17 is a flowchart showing initialization processing to be executed by the printer 300 of the present embodiment. This processing is realized by causing the CPU 311 to load a program stored in the program memory 313 into the data memory 314 and then to execute the program. The present embodiment is different from the first embodiment in that a determination is made in a first procedure in the initialization processing as to whether or not the printer 300 can communicate with the cloud server 200, and that the printer 300 is provided with a tentative printing mode. As with the first embodiment, the initialization processing is carried out in the present embodiment in the case of starting the use of the printer 300 after purchase, in the case of starting the reuse after the transportation, and the like.

In the case where the initialization processing is started in the present embodiment, the CPU 311 determines whether or not the printer 300 can communicate with the cloud server 200 (a communication determination) in S1701. In the case where the printer 300 cannot communicate with the cloud server 200, the CPU 311 proceeds to S1702 and causes the operating panel 305 of the printer 300 to display the error screen shown in FIG. 16C. Thereafter, in S1703, the CPU 311 determines whether or not the transportation mode processing has been executed.

In the case where the determination is made that the transportation mode processing is yet to be executed in S1703, the CPU 311 proceeds to S1705 and sets the status of the printer 300 to the tentative printing mode. In the present embodiment, the printer 300 is provided with the tentative printing mode in addition to the normal printing mode and the transportation mode. Here, the tentative printing mode is a mode to activate the printer 300 in a state of not being capable of communicating with the server. This is a state in which the print head 602 can eject the inks and the carriage 605 can travel along the carriage support portion 604. However, since the printer 300 cannot communicate with the cloud server 200, the services including the ink delivery, the management of the number of printed sheets, and the like are not available.

Meanwhile, in the case of where the determination is made in S1703 that the transportation mode processing has been executed, the CPU 311 proceeds to S1704 and causes the operating panel 305 of the printer 300 to display a screen shown in FIG. 18 to be described later, thereby causing the user to select whether or not to transition to the tentative printing mode. In the case where the user selects the transition to the tentative printing mode, the CPU 311 proceeds to S1705 to cause the status of the printer 300 to transition to the tentative printing mode.

On the other hand, in the case where the printer 300 can communicate with the cloud server 200 in S1701, the CPU 311 proceeds to S1706 and determines whether or not the service has been cancelled. In the case where the service has been cancelled, the CPU 311 proceeds to S1707 and causes the operating panel 305 of the printer 300 to display the error screen shown in FIG. 16D. Meanwhile, in the case where the determination is made that the service has not been cancelled in S1706, the CPU 311 proceeds to S1708 and determines whether or not the transportation mode processing has been executed. In the case where the transportation mode processing has been executed, the CPU 311 proceeds to S1709 and causes the status of the printer 300 to transition from the transportation mode to the normal printing mode.

Figure 18:
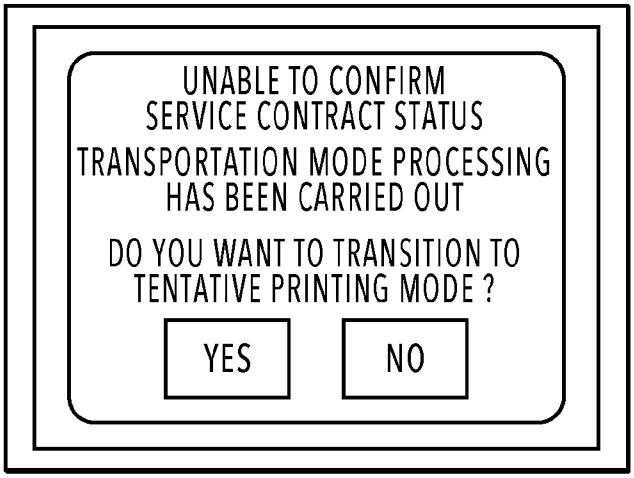
FIG. 18 is a schematic diagram showing a display screen to be displayed on the operating panel of the printer.

FIG. 18 is a schematic diagram showing the display screen to be displayed on the operating panel 305 of the printer 300. The display screen shown in FIG. 18 is the screen to be displayed on the operating panel 305 of the printer 300 in the case of causing the user to select whether or not to transition to the tentative printing mode in S1704 of FIG. 17. The user can operate the screen by pressing any of "yes" and "no" buttons depending on the selection as to whether or not to transition to the tentative printing mode.

The present embodiment has described the configuration that can be activated in the tentative printing mode even in the case of not being capable of communicating with the cloud server 200 or confirming the state of the service contract. However, the present invention is not limited only to this configuration. The present invention may also be configured to stop the operation of the printing apparatus in the case where it is not possible to confirm the state of the service contract.

As described above, the printing apparatus may also be configured to determine in the initialization processing as to whether or not the printer 300 is capable of performing the communication, and to enter the tentative printing mode in the case where the printer 300 cannot perform the communication.

Other Embodiments

The present invention can also be implemented by such processing that supplies a program to realize one or more functions of any of the above-described embodiments to a system or an apparatus through a network or a storage medium, and to cause one or more processors of a computer in the system or the apparatus to read and execute the program. The present invention can also be implemented by a circuit (such as an ASIC) that realizes on or more functions mentioned above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-041311 filed Mar. 16, 2022, which is hereby incorporated by reference herein in its entirety.

What is claimed is:

1. A printing apparatus to be provided to a user based on a contract and to be returned by transportation arranged by the user after cancellation of the contract, wherein the printing apparatus can be connected to an ejection unit that ejects liquid, the printing apparatus comprises:

a control unit that performs control based on cancellation of the contract by the user in such a way as to carry out a transportation preparatory operation, the transportation preparatory operation being a preparatory operation to be carried out before the transportation and including a closing operation for preventing ink leakage that is carried out in a state in which connection to the ejection unit is maintained; and a display unit capable of displaying a screen for a user to perform the closing operation to prevent the ink leakage that is carried out in a state in which connection to the ejection unit is maintained.

2. The printing apparatus according to claim 1, wherein the printing apparatus is configured to be capable of carrying out the transportation preparatory operation irrespective of the cancellation of the contract by the user.

3. The printing apparatus according to claim 1, wherein in the transportation preparatory operation, the printing apparatus automatically executes processing that is automatically executable, and displays a content of the processing on a display screen in a case of causing the user to execute the processing manually.

4. The printing apparatus according to claim 1, further comprising:

the ejection unit that ejects liquid;

a storage unit that stores liquid; and a connection unit that connects the ejection unit and the storage unit, wherein the closing operation is a closing operation to prevent ink leakage from the ejection unit by a valve unit provided in the connection unit.

5. The printing apparatus according to claim 4, wherein the display unit displays a first screen for carrying out the closing operation in conjunction with the preparatory operation, and displays a second screen according to a contract state.

6. The printing apparatus according to claim 5, wherein the second screen is a screen that displays an error.

7. The printing apparatus according to claim 6, further comprising: a carriage unit that moves while mounting the ejection unit that ejects a liquid, and a storage unit that is connected to the ejection unit through a connector and stores the liquid to be supplied to the ejection unit through the connector, wherein the transportation preparatory operation includes a fixing action to fix the carriage unit so as not to move, the closing operation to close the connector, and a discharging action to discharge the liquid inside the connector and the liquid inside the ejection unit.

8. The printing apparatus according to claim 7, wherein the resetting action is carried out after the fixing action, the closing operation, and the discharging action in the transportation preparatory operation.

9. The printing apparatus according to claim 1, further comprising:

a contract determination unit that determines whether or not the contract is continued, wherein the contract determination unit performs the determination at a start of use.

10. The printing apparatus according to claim 9, wherein the printing apparatus transitions to a state of being capable of printing in the case where the contract is continued as a result of the determination by the contract determination unit.

11. The printing apparatus according to claim 9, further comprising: a communication determination unit that determines whether or not it is possible to perform communication with a server, wherein the contract determination unit performs the determination in a case where it is determined to be possible to perform the communication as a result of the determination by the communication determination unit.

12. The printing apparatus according to claim 11, wherein the printing apparatus is provided with a tentative printing mode of activating the printing apparatus without communicating with the server in a case where it is determined to be impossible to perform the communication as a result of the determination by the communication determination unit.

13. The printing apparatus according to claim 11, wherein the printing apparatus stops operating in a case where it is determined to be impossible to perform the communication as a result of the determination by the communication determination unit.

14. A method of controlling a printing apparatus to be provided to a user based on a contract and to be returned by transportation arranged by the user after cancellation of the contract, wherein the printing apparatus can be connected to an ejection unit that ejects liquid, the method comprising:

controlling the printing apparatus to perform control based on cancellation of the contract by the user in such a way as to carry out a transportation preparatory operation, the transportation preparatory operation being a preparatory operation to be carried out before the transportation and including a closing operation for preventing ink leakage that is carried out in a state in which connection to the ejection unit is maintained; and displaying a screen for a user to perform the closing operation to prevent the ink leakage that is carried out in a state in which connection to the ejection unit is maintained.

15. A printing system, comprising: a printing apparatus to be provided to a user based on a contract and to be returned by transportation arranged by the user after cancellation of the contract, wherein the printing apparatus can be connected to an ejection unit that ejects liquid; and a server that is communicably connected to the printing apparatus, and manages the contract of the user, wherein the printing apparatus includes a control unit that performs control, which is based on information being notified by the server and indicating cancellation of the contract by the user, in such a way as to carry out a transportation preparatory operation, the transportation preparatory operation being a preparatory operation to be carried out before the transportation and including a closing operation for preventing ink leakage that is carried out in a state in which connection to the ejection unit is maintained; and a display unit capable of displaying a screen for a user to perform the closing operation to prevent the ink leakage that is carried out in a state in which connection to the ejection unit is maintained.

16. A non-transitory computer-readable storage medium for causing a computer to function as a unit in a printing apparatus to be provided to a user based on a contract and to be returned by transportation arranged by the user after cancellation of the contract, wherein the printing apparatus can be connected to an ejection unit that ejects liquid, the storage medium storing a program comprising:

a controlling step of performing control based on cancellation of the contract by the user in such a way as to carry out a transportation preparatory operation, the transportation preparatory operation being a preparatory operation to be carried out before the transportation and including a closing operation for preventing ink leakage that is carried out in a state in which connection to the ejection unit is maintained; and a display step of displaying a screen for a user to perform the closing operation to prevent the ink leakage that is carried out in a state in which connection to the ejection unit is maintained.

* * * * *